United States Patent
Krah et al.

(10) Patent No.: US 10,747,296 B2
(45) Date of Patent: *Aug. 18, 2020

(54) POWER MANAGEMENT FOR TOUCH CONTROLLER

(71) Applicant: Apple Inc., Cupertino, CA (US)

(72) Inventors: Christoph H. Krah, Cupertino, CA (US); Thomas James Wilson, Falmouth, ME (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/275,961

(22) Filed: Feb. 14, 2019

(65) Prior Publication Data

US 2019/0286220 A1   Sep. 19, 2019

Related U.S. Application Data

(60) Continuation of application No. 15/260,257, filed on Sep. 8, 2016, now Pat. No. 10,222,854, which is a
(Continued)

(51) Int. Cl.
*G06F 1/3287* (2019.01)
*G06F 3/041* (2006.01)
(Continued)

(52) U.S. Cl.
CPC .......... *G06F 1/3287* (2013.01); *G06F 1/3215* (2013.01); *G06F 1/3262* (2013.01);
(Continued)

(58) Field of Classification Search
None
See application file for complete search history.

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| JP | 2000-163031 A | 6/2000 |
| JP | 2002-342033 A | 11/2002 |

OTHER PUBLICATIONS

Final Office Action dated Apr. 23, 2013, for U.S. Appl. No. 12/557,962, filed Sep. 11, 2009, 16 pages.
(Continued)

*Primary Examiner* — Benjamin C Lee
*Assistant Examiner* — Emily J Frank
(74) *Attorney, Agent, or Firm* — Kubota & Basol LLP

(57) ABSTRACT

Power management for a touch controller is disclosed. The touch controller can include a transmit section for transmitting stimulation signals to an associated touch sensor panel to drive the panel, where the touch controller can selectively adjust the transmit section to reduce power during the transmission. The touch controller can also include a receive section for receiving touch signals resulting from the driving of the panel, where the touch controller can selectively adjust the receive section to reduce power during the receipt of the touch signals. The touch controller can also include a demodulation section for demodulating the received touch signals to obtain touch event results, where the touch controller can selectively adjust the demodulation section to reduce power during the demodulation of the touch signals. The touch controller can also selectively reduce power below present low levels during idle periods.

20 Claims, 22 Drawing Sheets

Related U.S. Application Data division of application No. 14/749,524, filed on Jun. 24, 2015, now Pat. No. 9,529,415, which is a division of application No. 14/600,973, filed on Jan. 20, 2015, now Pat. No. 9,098,286, which is a continuation of application No. 12/557,962, filed on Sep. 11, 2009, now Pat. No. 8,970,506.

(51) Int. Cl.
*G06F 1/3296* (2019.01)
*G06F 1/3215* (2019.01)
*G06F 1/3234* (2019.01)

(52) U.S. Cl.
CPC ............ *G06F 1/3296* (2013.01); *G06F 3/041* (2013.01); *G06F 3/0416* (2013.01); *Y02D 50/20* (2018.01)

(56) References Cited

U.S. PATENT DOCUMENTS

| | | |
|---|---|---|
| 5,790,875 A | 8/1998 | Andersin et al. |
| 5,825,352 A | 10/1998 | Bisset et al. |
| 5,835,079 A | 11/1998 | Shieh |
| 5,880,411 A | 3/1999 | Gillespie et al. |
| 6,058,485 A | 5/2000 | Koziuk et al. |
| 6,188,391 B1 | 2/2001 | Seely et al. |
| 6,282,177 B1 | 8/2001 | Ostermiller et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 6,801,196 B1 | 10/2004 | Bodley et al. |
| 7,015,894 B2 | 3/2006 | Morohoshi |
| 7,016,705 B2 | 3/2006 | Bahl et al. |
| 7,023,425 B2 | 4/2006 | Casebolt et al. |
| 7,184,064 B2 | 2/2007 | Zimmerman et al. |
| 7,506,189 B1 | 3/2009 | Lee et al. |
| 7,508,451 B2 | 3/2009 | Sheng et al. |
| 7,509,150 B1 | 3/2009 | Simmons |
| 7,663,607 B2 | 2/2010 | Hotelling et al. |
| 8,479,122 B2 | 7/2013 | Hotelling et al. |
| 8,970,506 B2 * | 3/2015 | Krah ..................... G06F 1/3215 345/173 |
| 9,098,286 B2 | 8/2015 | Krah et al. |
| 10,222,854 B2 * | 3/2019 | Krah ..................... G06F 1/3215 |
| 2006/0026521 A1 | 2/2006 | Hotelling et al. |
| 2006/0097991 A1 | 5/2006 | Hotelling et al. |
| 2006/0197753 A1 | 9/2006 | Hotelling |
| 2007/0043963 A1 | 2/2007 | Cheng et al. |
| 2008/0162996 A1 | 7/2008 | Krah et al. |
| 2008/0272827 A1 | 11/2008 | Smit et al. |
| 2008/0307240 A1 | 12/2008 | Dahan et al. |
| 2009/0260898 A1 | 10/2009 | Jin et al. |
| 2010/0115314 A1 | 5/2010 | Sultenfuss |
| 2011/0061947 A1 | 3/2011 | Krah et al. |
| 2015/0134994 A1 | 5/2015 | Krah et al. |
| 2015/0293583 A1 | 10/2015 | Krah et al. |
| 2016/0378171 A1 | 12/2016 | Krah et al. |

OTHER PUBLICATIONS

Final Office Action dated Jul. 15, 2014 for U.S. Appl. No. 12/557,962, filed Sep. 11, 2009, 16 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Dec. 21, 2012 for U.S. Appl. No. 12,557,962, filed Sep. 11, 2009, 13 pages.
Non-Final Office Action dated Mar. 27, 2014, for U.S. Appl. No. 12/557,962, filed Sep. 11, 2009, 15 pages.
Non-Final Office Action dated May 9, 2016, for U.S. Appl. No. 14/749,524, filed Jun. 24, 2015, 14 pages.
Non-Final Office Action dated Apr. 5, 2018, for U.S. Appl. No. 15/260,257, filed Sep. 8, 2016, 17 pages.
Notice of Allowance dated Oct. 16, 2014, for U.S. Appl. No. 12/557,962, filed Sep. 11, 2009, 8 pages.
Notice of Allowance dated Mar. 27, 2015, for U.S. Appl. No. 14/600,973, filed Jan. 20, 2015, 8 pages.
Notice of Allowance dated Jul. 5, 2016, for U.S. Appl. No. 14/749,524, filed Jun. 24, 2015, seven pages.
Notice of Allowance dated Sep. 9, 2016, for U.S. Appl. No. 14/749,524, filed Jun. 24, 2015, seven pages.
Notice of Allowance dated Nov. 25, 2016, for U.S. Appl. No. 14/749,524, filed Jun. 24, 2015, five pages.
Notice of Allowance dated Oct. 19, 2018, for U.S. Appl. No. 15/260,257, filed Sep. 8, 2016, seven pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Supplemental Notice of Allowance dated Apr. 13, 2015, for U.S. Appl. No. 14/600,973, filed Jan. 20, 2015, four pages.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Advisory Action received for U.S. Appl. No. 12/557,962, dated Sep. 10, 2014, 3 pages.
Advisory Action received for U.S. Appl. No. 12/557,962, dated Sep. 23, 2013, 3 pages.
Restriction Requirement received for U.S. Appl. No. 12/557,962, dated Aug. 16, 2012, 6 pages.

* cited by examiner

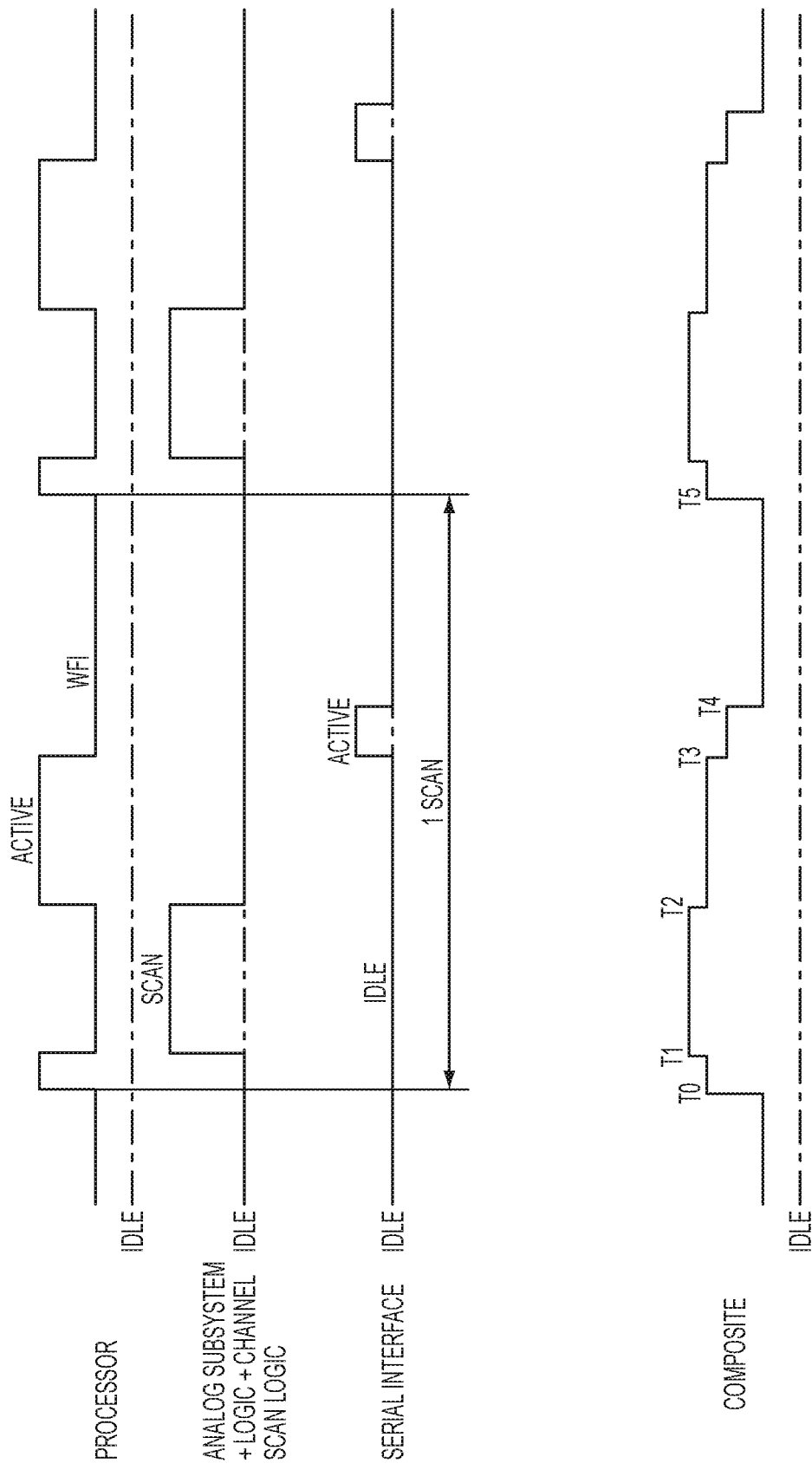

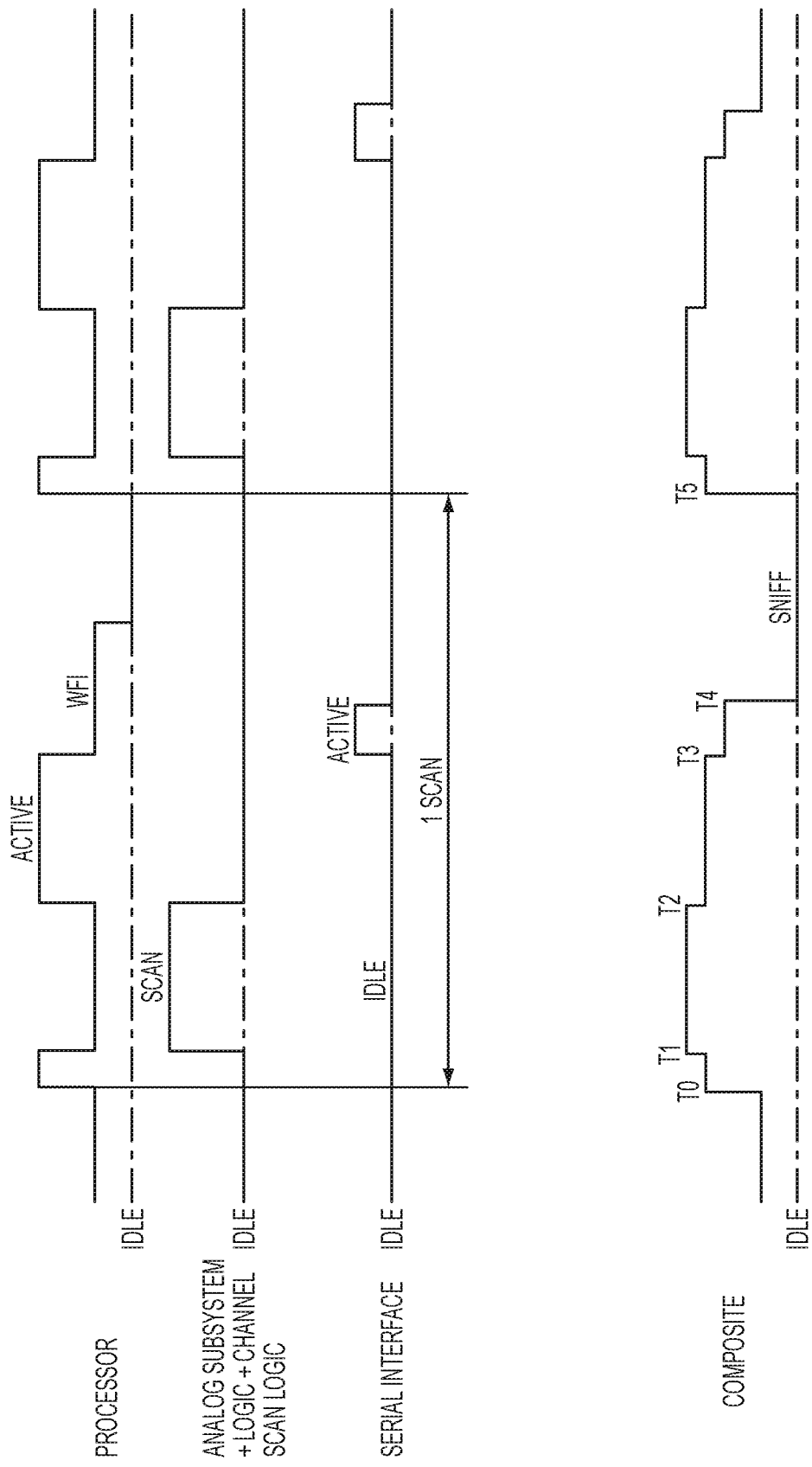

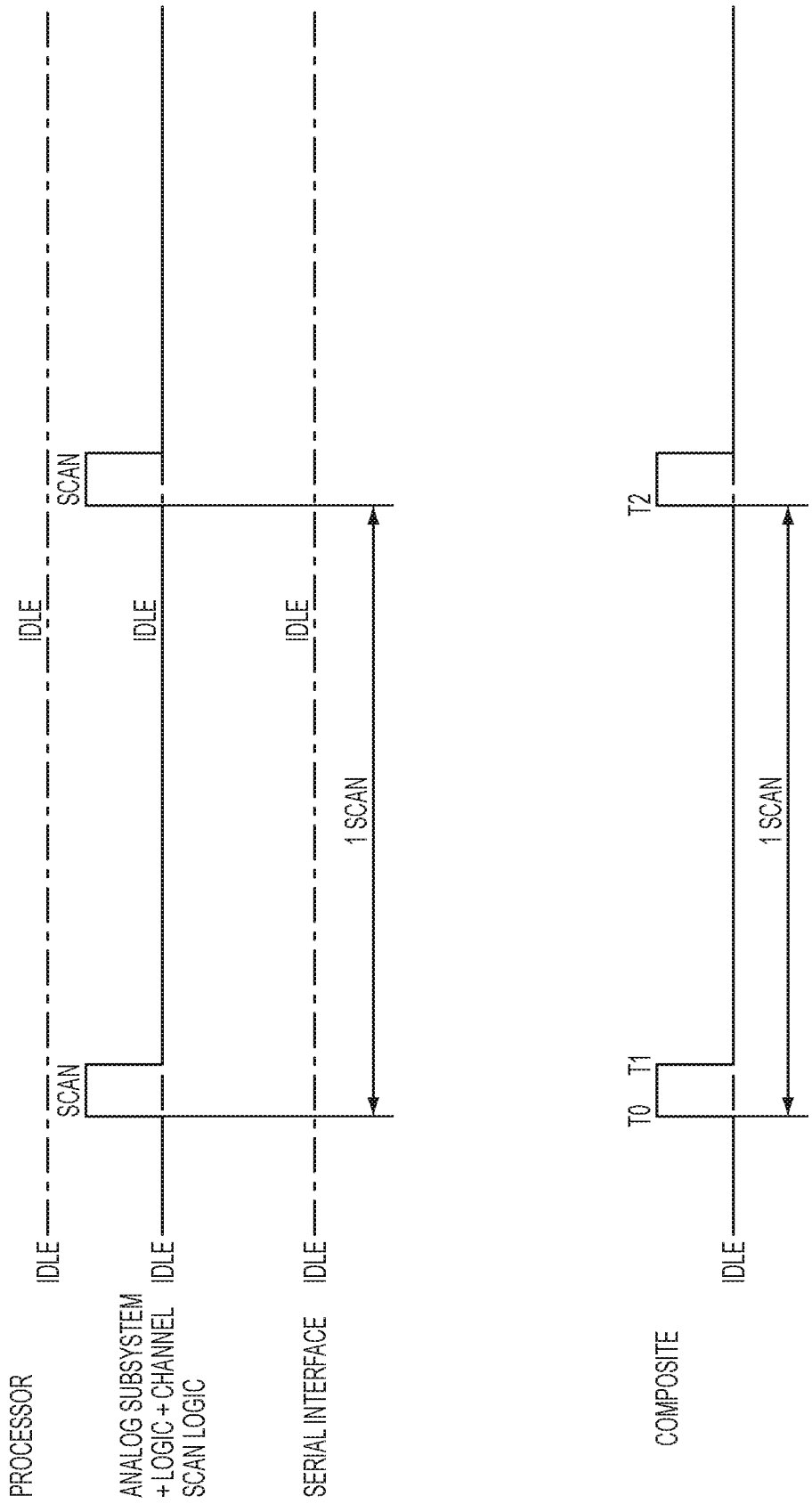

| | | | | | | | | | | | SYSTEM PARAMETERS ⟵ POWER MANAGEMENT PARAMETERS ⟶ | |
|---|---|---|---|---|---|---|---|---|---|---|---|---|
| DPPC[0] | NZ[0] | TEMP[0] | IADJ_TIA[0] | IADJ_BPF[0] | IADJ_AAF[0] | IADJ_ADC[0] | BYP_BPF[0] | BYP_AAF[0] | SRADJ_BUF[0] | TADJ_INT[0] | STM_DMX[0] |
| DPPC[1] | NZ[1] | TEMP[1] | IADJ_TIA[1] | IADJ_BPF[1] | IADJ_AAF[1] | IADJ_ADC[1] | BYP_BPF[1] | BYP_AAF[1] | SRADJ_BUF[1] | TADJ_INT[1] | STM_DMX[1] |
| ⋮ | ⋮ | ⋮ | ⋮ | ⋮ | ⋮ | ⋮ | ⋮ | ⋮ | ⋮ | ⋮ | ⋮ |
| DPPC[N-1] | NZ[N-1] | TEMP[N-1] | IADJ_TIA[N-1] | IADJ_BPF[N-1] | IADJ_AAF[N-1] | IADJ_ADC[N-1] | BYP_BPF[N-1] | BYP_AAF[N-1] | SRADJ_BUF[N-1] | TADJ_INT[N-1] | STM_DMX[N-1] |

FIG. 16

POWER MANAGEMENT FOR TOUCH CONTROLLER

CROSS-REFERENCE TO RELATED APPLICATIONS

This application is a continuation application of Ser. No. 15/260,257, filed Sep. 8, 2016 (U.S. Patent Application Publication No. 2016/0378171), which is a divisional application of U.S. Ser. No. 14/749,524, filed Jun. 24, 2015 (now U.S. Pat. No. 9,529,415) which is a divisional application of U.S. patent application Ser. No. 14/600,973, filed Jan. 20, 2015 (now U.S. Pat. No. 9,098,286, issued Aug. 4, 2015), which is a continuation application of Ser. No. 12/557,962, filed Sep. 11, 2009 (now U.S. Pat. No. 8,970,506, issued Mar. 3, 2015) all of which are hereby incorporated by reference in their entirety for all purposes.

FIELD

This relates generally to controllers for touch sensitive devices and, more particularly, to power management of controllers for touch sensitive devices.

BACKGROUND

Many types of input devices are presently available for performing operations in a computing system, such as buttons or keys, mice, trackballs, joysticks, touch sensor panels, touch screens and the like. Touch sensitive devices, such as touch screens, in particular, are becoming increasingly popular because of their ease and versatility of operation as well as their declining price. A touch sensitive device can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch sensitive device can allow a user to perform various functions by touching the touch sensor panel using a finger, stylus or other object at a location dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

To achieve a certain ease and versatility of operation, touch sensitive devices can have significant power requirements, which can be due to the components required to operate the touch sensitive device as well as the functions performed on the device. Such power requirements can unfortunately lead to shorter battery usage between recharges, reduced functionality to conserve power, or larger touch sensitive devices to house more powerful power supplies.

SUMMARY

This relates to touch controller power management of a touch sensitive device. The touch controller can manage device power so as to reduce power consumption at certain times for the device. The touch controller can selectively adjust bias current to components in a receive section of the device and/or can selectively bypass components in the receive section to reduce power while processing touch events, where the receive section can receive touch signals indicative of the touch events. The touch controller can also selectively adjust operating time of components in a demodulation section of the device and/or can select demodulation data to be used by components in the demodulation section to reduce power while processing touch events, where the demodulation section can demodulate the touch signals received from the receive section. The touch controller can selectively adjust slew rates of components in a transmit section of the device while processing touch events, where the transmit section can provide stimulation signals to stimulate the device to generate the touch signals. The touch controller can also selectively reduce power consumption below present low power levels during idle periods of the device. The power management can advantageously provide power savings for the device.

BRIEF DESCRIPTION OF THE DRAWINGS

FIGS. 13a-13e illustrate exemplary power diagrams for operating modes of a system having touch controller power management according to various embodiments.

FIG. 16 illustrates an exemplary lookup table for touch controller power management according to various embodiments.

DETAILED DESCRIPTION

In the following description of various embodiments, reference is made to the accompanying drawings which form a part hereof, and in which it is shown by way of illustration specific embodiments which can be practiced. It is to be understood that other embodiments can be used and structural changes can be made without departing from the scope of the various embodiments.

This relates to power management of a touch controller of a touch sensitive device. The touch controller can include power management logic to apply power adjustments to components of the device to reduce power. The power management logic can selectively apply bias current adjustments and/or bypass commands to components of the touch controller's receive section configured to receive touch signals from the associated touch sensor panel. The power management logic can selectively apply time adjustments and/or demodulation data selection to components of the touch controller's demodulation section configured to demodulate the touch signals received from the receive section. The power management logic can selectively apply slew rate adjustments to components of the touch controller's transmit section configured to provide stimulation signals to the associated touch sensor panel for generating the touch signals. The power management logic can selectively apply lower power consumption requirements to the device during idle periods.

The touch controller power management can advantageously reduce power consumption of components in touch sensitive devices, which can result in power savings in the devices. The power savings can be realized in longer battery life, more robust functionalities that consume power, smaller power supplies, and smaller devices.

Although various embodiments can be described and illustrated herein in terms of mutual capacitance touch sensor panels, it should be understood that the various embodiments are not so limited, but can be additionally applicable to self-capacitance sensor panels, and both single and multi-touch sensor panels, and other sensors in which single stimulation signals can be used to generate a touch signal and in which multiple simultaneous stimulation signals can be used to generate a composite touch signal. Furthermore, although various embodiments can be described and illustrated herein in terms of double-sided ITO (DITO) touch sensor panels, it should be understood that the various embodiments can be also applicable to other touch sensor panel configurations, such as configurations in which the drive and sense lines can be formed on different substrates or on the back of a cover glass, and configurations in which the drive and sense lines can be formed on the same side of a single substrate.

Figure 1:
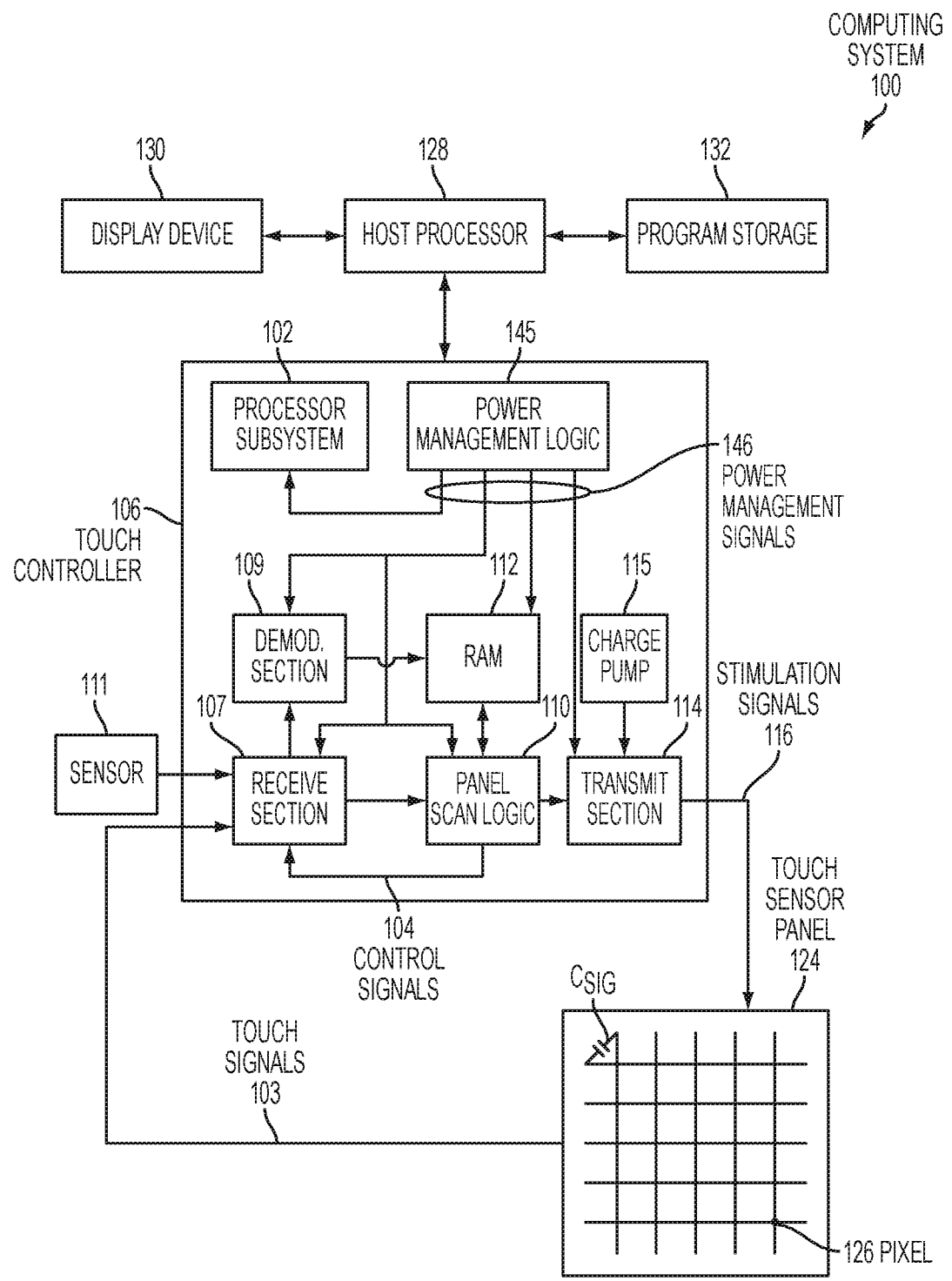
FIG. 1 illustrates an exemplary computing system having touch controller power management according to various embodiments.

FIG. 1 illustrates an exemplary computing system 100 that can have touch controller power management according to various embodiments described herein. In the example of FIG. 1, computing system 100 can include touch controller 106. The touch controller 106 can be a single application specific integrated circuit (ASIC) that can include one or more processor subsystems 102, which can include one or more main processors, such as ARM968 processors or other processors with similar functionality and capabilities. However, in other embodiments, the processor functionality can be implemented instead by dedicated logic, such as a state machine. The processor subsystems 102 can also include peripherals (not shown) such as random access memory (RAM) or other types of memory or storage, watchdog timers and the like. The touch controller 106 can also include receive section 107 for receiving signals, such as touch signals 103 of one or more sense channels (not shown), other signals from other sensors such as sensor 111, etc. The touch controller 106 can also include demodulation section 109 such as a multistage vector demodulation engine, panel scan logic 110, and transmit section 114 for transmitting stimulation signals 116 to touch sensor panel 124 to drive the panel. The panel scan logic 110 can access RAM 112, autonomously read data from the sense channels, and provide control for the sense channels. In addition, the panel scan logic 110 can control the transmit section 114 to generate the stimulation signals 116 at various frequencies and phases that can be selectively applied to rows of the touch sensor panel 124.

The touch controller 106 can also include charge pump 115, which can be used to generate the supply voltage for the transmit section 114. The stimulation signals 116 can have amplitudes higher than the maximum supply voltage by cascading two charge store devices, e.g., capacitors, together to form the charge pump 115. Although FIG. 1 shows the charge pump 115 separate from the transmit section 114, the charge pump can be part of the transmit section.

The touch controller 106 can also include power management logic 145, which can be used to manage power consumption by various components of the controller. The power management logic 145 can access the processor subsystem 102, the receive section 107, the demodulation section 109, the panel scan logic 110, the RAM 112, and the transmit section 114, autonomously receive data from and send data to these components via, for example, power management signals 146, and manage power consumption of these components. The power management logic 145 can be partially or entirely part of or separate from the processor subsystem 102. Alternatively, the power management logic 145 can be implemented partially or entirely in dedicated logic, such as a state machine.

Touch sensor panel 124 can include a capacitive sensing medium having row traces (e.g., drive lines) and column traces (e.g., sense lines), although other sensing media can also be used. The row and column traces can be formed from a transparent conductive medium such as Indium Tin Oxide (ITO) or Antimony Tin Oxide (ATO), although other transparent and non-transparent materials such as copper can also be used. In some embodiments, the row and column traces can be perpendicular to each other, although in other embodiments other non-Cartesian orientations are possible. For example, in a polar coordinate system, the sense lines can be concentric circles and the drive lines can be radially extending lines (or vice versa). It should be understood, therefore, that the terms "row" and "column" as used herein are intended to encompass not only orthogonal grids, but the intersecting traces of other geometric configurations having first and second dimensions (e.g. the concentric and radial lines of a polar-coordinate arrangement). The rows and columns can be formed on, for example, a single side of a substantially transparent substrate separated by a substantially transparent dielectric material, on opposite sides of the substrate, on two separate substrates separated by the dielectric material, etc.

At the "intersections" of the traces, where the traces pass above and below (cross) each other (but do not make direct electrical contact with each other), the traces can essentially form two electrodes (although more than two traces can intersect as well). Each intersection of row and column traces can represent a capacitive sensing node and can be viewed as picture element (pixel) 126, which can be particularly useful when the touch sensor panel 124 is viewed as capturing an "image" of touch. (In other words, after the touch controller 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between row and column electrodes can appear as a stray capacitance Cstray when the given row is held at direct current (DC) voltage levels and as a mutual signal capacitance Csig when the given row is stimulated with an alternating current (AC) signal. The presence of a finger or other grounded conductive object near or on the touch sensor panel can shunt some of the electric field between the row and column electrodes to ground, which can cause Csig to decrease. This decrease can in turn cause a signal charge Qsig present at the pixels being touched to decrease, where Qsig can be the product of Csig multiplied by the stimulation signal amplitude. Therefore, the distance between a grounded object, such as a finger, and a touched pixel can be related to the level of Qsig.

Computing system 100 can also include host processor 128 for receiving outputs from the processor subsystems 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 128 can also perform additional functions that may not be related to panel processing, and can be coupled to program storage 132 and display device 130 such as an LCD display for providing a UI to a user of the device. In some embodiments, the host processor 128 can be a separate component from the touch controller 106, as shown. In other embodiments, the host processor 128 can be included as part of the touch controller 106. In still other embodiments, the functions of the host processor 128 can be performed by the processor subsystem 102 and/or distributed among other components of the touch controller 106. The display device 130 together with the touch sensor panel 124, when located partially or entirely under the touch sensor panel or when integrated with the touch sensor panel, can form a touch sensitive device such as a touch screen.

Note that one or more of the functions described above can be performed, for example, by firmware stored in memory (e.g., one of the peripherals) and executed by the processor subsystem 102, or stored in the program storage 132 and executed by the host processor 128. The firmware can also be stored and/or transported within any computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the touch sensor panel is not limited to touch, as described in FIG. 1, but can be a proximity panel or any other panel according to various embodiments. In addition, the touch sensor panel described herein can be either a single-touch or a multi-touch sensor panel.

It is further to be understood that the touch controller is not limited to the components and configuration of FIG. 1, but can include other and/or additional components in various configurations capable of power management according to various embodiments.

Figure 2:
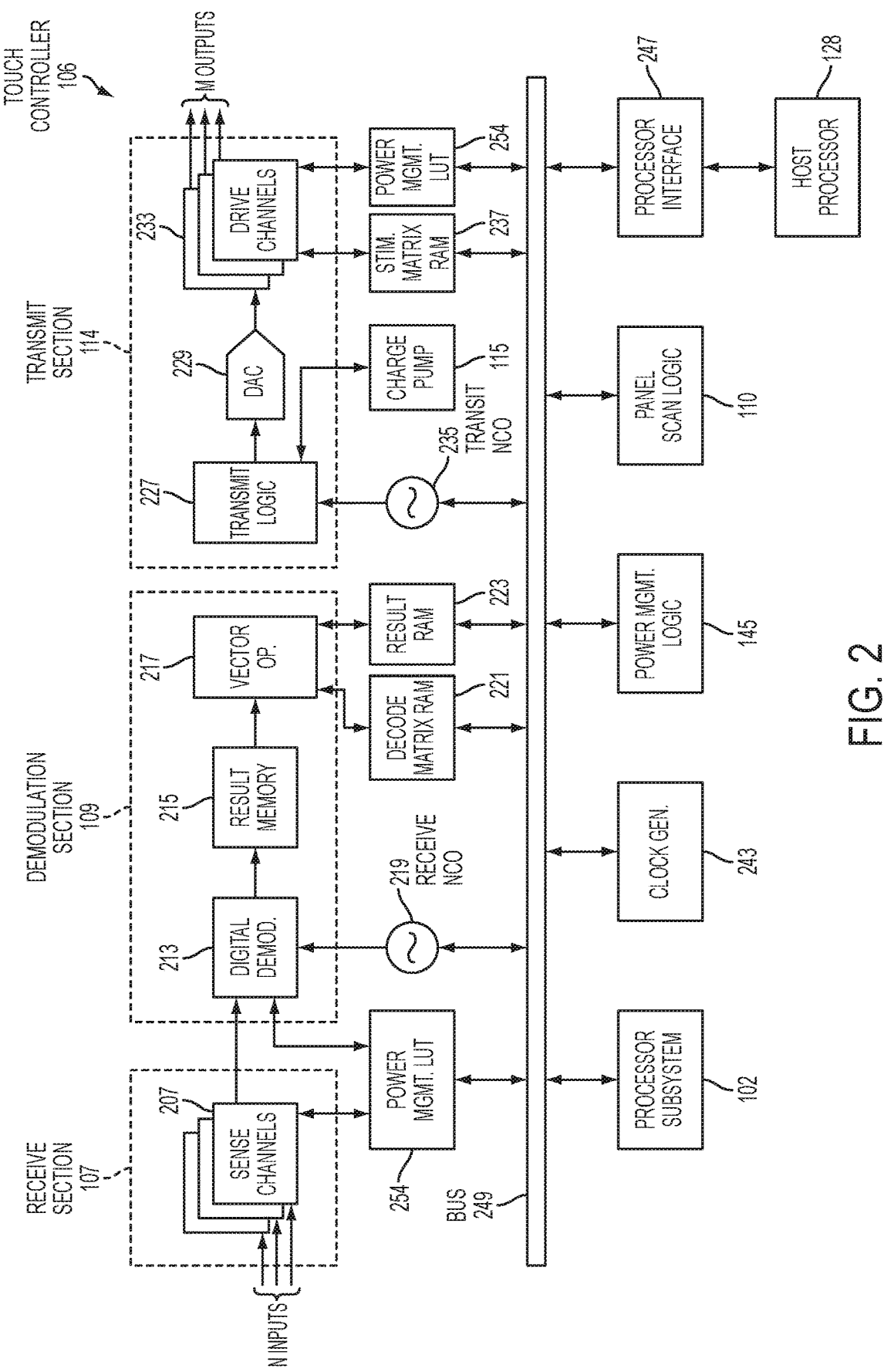
FIG. 2 illustrates an exemplary touch controller having power management according to various embodiments.

FIG. 2 illustrates an exemplary touch controller having power management according to various embodiments. In the example of FIG. 2, touch controller 106 can include receive section 107, which can include a total of N receive channels, such as sense channels 207. The sense channels 207 can receive touch signals (illustrated by N inputs in FIG. 2) from sense lines of an associated touch sensor panel indicative of a touch or near touch at the panel, for example. The sense channels 207 can connect to power management lookup table (LUT) 254 for receiving LUT data to manage power consumption. Each sense channel 207 can include a receive analog-to-digital converter (ADC) (not shown) to convert the analog touch signals to digital touch signals for further processing.

The touch controller 106 can also include demodulation section 109 for demodulating the touch signals from the receive section 107. The demodulation section 109 can include digital demodulator 213, result memory 215, and vector operator 217. The digital demodulator 213 can connect to receive numerically-controlled oscillator (NCO) 219 for phase and frequency data, to the power management LUT 254 for receiving LUT data to manage power consumption, and to the receive section 107 for receiving digital touch signals. The result memory 215 can save the demodulated touch signals for further processing. The vector operator 217 can connect to decode matrix RAM 221 for receiving data to decode the touch signals into signal capacitance Csig values and to result RAM 223 for saving the Csig values for further processing.

The touch controller 106 can also include transmit section 114, which can include transmit logic 227, transmit digital-to-analog converter (DAC) 229, and a total of M transmit channels such as drive channels 233. The transmit logic 227 can connect to transmit NCO 235 for phase and frequency data and to charge pump 115 for power to the drive channels 233. The transmit DAC 229 can convert digital signals from the transmit logic 227 into analog signals to the drive channels 233. The drive channels 233 can connect to stimulation matrix RAM 237 for receiving data to generate stimulation signals (illustrated by M outputs in FIG. 2) to stimulate drive lines of the associated touch sensor panel, for example. The drive channels 233 can also connect to the power management LUT 254 for receiving LUT data to manage power consumption.

The touch controller 106 can also include processor subsystem 102, clock generator 243, panel scan logic 110, and processor interface 247, which can connect via bus 249 to other components of the controller. The processor subsystem 102 can store and update, for example, decode data in a decode matrix on the decode matrix RAM 221, stimulation data in a stimulation matrix on the stimulation matrix RAM 237, and LUT data in the power management LUT 254. The processor subsystem 102 can further initialize the system, process data from the sense channels 207, and facilitate communication with the host processor 128. The clock generator 243 can provide clock data. The panel scan logic 110 can access RAM 112, autonomously read data from the sense channels 207, and provide control for the sense channels and for the drive channels 233. The processor interface 247 can provide an interface for the host processor 128.

The touch controller 106 can also include power management logic 145 for managing power consumption of various components of the system. The power management logic 145 can access the power management LUT 254 via the bus 249 and can store and update the LUT data. The power management logic 145 can be included either partially or entirely in or separate, e.g., as a state machine, from the processor subsystem 102.

The decode matrix RAM 221, the result RAM 223, and the stimulation matrix RAM 237 can be part of the RAM 112, for example, in the touch controller 106. The power management LUT 254 can be stored in the RAM 112, for example.

In an example operation, the transmit section 114 of the touch controller 106 can perform as follows. The transmit logic 227, which can be powered by the charge pump 115, can generate digital signals based on the transmit NCO 235. The transmit DAC 229 can convert the digital signals into stimulation signals and transmit the stimulation signals to the drive channels 233. The drive channels 233 can transmit the stimulation signals to corresponding drive lines of the associated touch sensor panel. The phases (and/or other signal parameters) of the stimulation signals transmitted by the drive channels 233 can be set based on data in the stimulation matrix stored in the stimulation matrix RAM 237. The panel scan logic 110 can control the timing of the stimulation signal transmissions to the drive lines. The panel scan logic 110 can also modify the data in the stimulation matrix. The power consumption of the drive channels 233 can be managed based on data in the power management LUT 254. The power management logic 145 can control the data sent from the LUT 254 to the drive channels 233.

As the drive channels 233 drive the drive lines of the associated touch sensor panel, the panel can sense a change in capacitance on corresponding sense lines of the panel as a result of a touch or near touch at the panel. Touch signals can be generated as a function of the capacitance change and transmitted along the sense lines to the receive section 107 of the touch controller 106. The panel scan logic 110 can control the scanning of the panel in order to transmit the touch signals to the receive section 107.

The receive section 107 of the touch controller 106 can perform as follows. The sense channels 207 can receive the touch signals from the associated touch sensor panel. The power consumption of the sense channels 207 can be managed based on data in the power management LUT 254. The power management logic 145 can control the data sent from the LUT 254 to the sense channels 207. The sense channels 207 can convert the received touch signals to digital signals and transmit the digital signals to the demodulation section 109 for further processing.

The demodulation section 109 of the touch controller 106 can perform as follows. The digital demodulator 213 can demodulate the digital signals from the sense channels 207 by multiplying the signals with a demodulation signal of the same frequency generated by the receive NCO 219. The power consumption of the demodulator 213 can be managed based on data in the power management LUT 254. The power management logic 145 can control the data sent from the LUT 254 to the demodulator 213. The result memory 215 can store the demodulated touch signals for further processing. Because multiple drive lines of the touch sensor panel can be driven at a time, each generated touch signal can be a composite of multiple signal capacitances sensed by each sense line's pixels in the panel. As such, a determination can be made from the composite of pixel capacitances on each sense channel 207, e.g., by the vector operator 217. The vector operator 217 can apply data in the decode matrix in the decode matrix RAM 221 to the demodulated touch signals from the result memory 215 to obtain the pixel capacitances for each sense channel 207. The result RAM 223 can store the sense channel capacitances for sensing touch or near touch at the panel, for example, using the processor subsystem 102, the host processor 128, and so on.

It is to be understood that the touch controller is not limited to the components, configuration, and operation described here in FIG. 2, but can include other and/or additional components, configurations, and/or operations capable of power management according to various embodiments.

Figure 3:
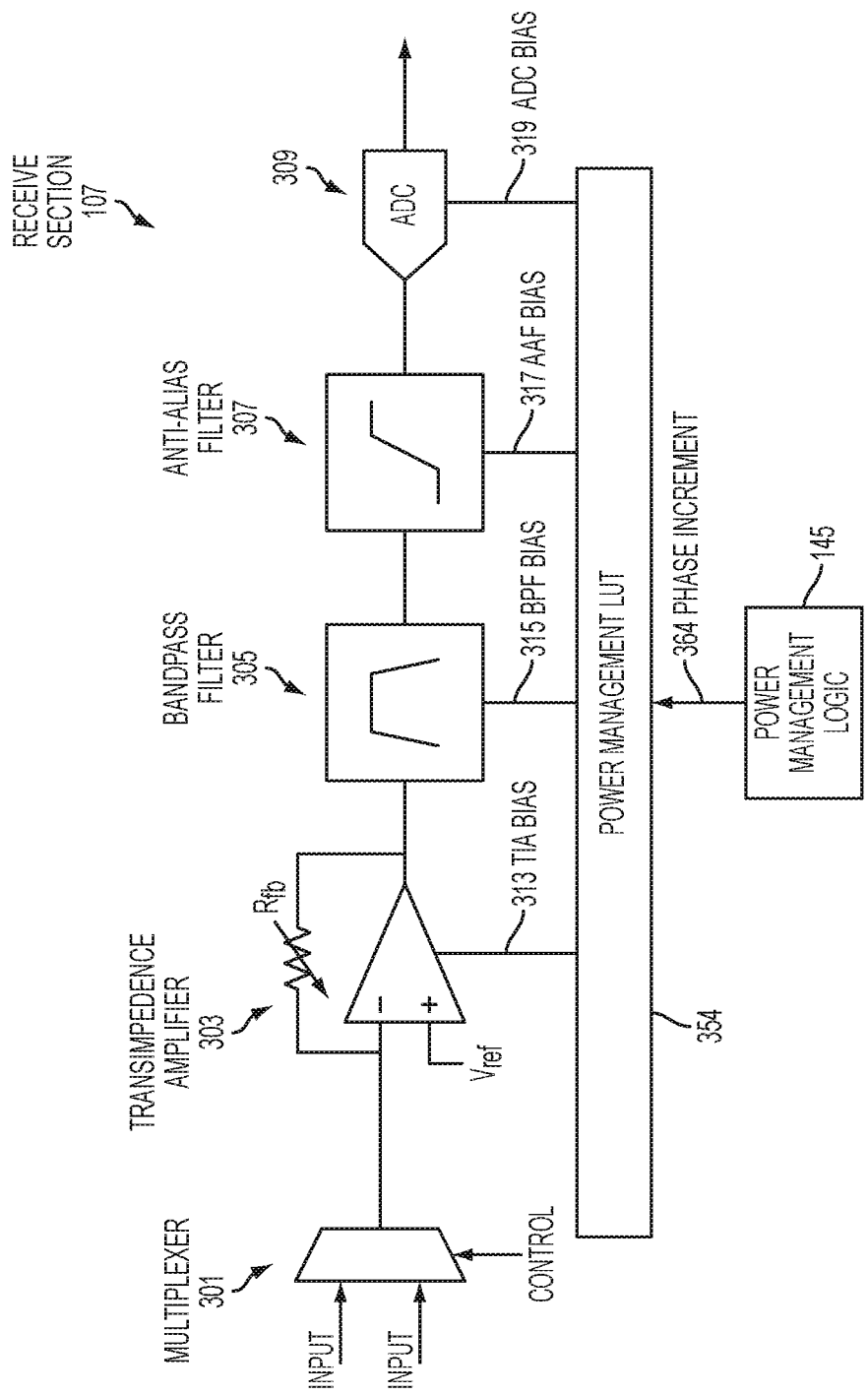
FIG. 3 illustrates an exemplary receive section of a touch controller having power management according to various embodiments.

FIG. 3 illustrates an exemplary receive section of a touch controller having power management according to various embodiments. FIG. 3 illustrates the details of one of the sense channels 207 in the receive section 107 of the touch controller 106. In the example of FIG. 3, receive section 107 of touch controller 106 can include sense channel 207 having multiplexer 301, transimpedence amplifier (TIA) 303, bandpass filter (BPF) 305, anti-alias filter (AAF) 307, and analog-to-digital converter (ADC) 309. The multiplexer 301 can select from one or more touch signal inputs from sense lines to the sense channel. The transimpedence amplifier 303 can convert the touch signal into a voltage signal. The output of the amplifier 303 can be fed to the bandpass filter 305 to reject noise components outside a particular band, e.g., components far from the fundamental frequency of the signal, about ±30 kHz in some embodiments. The output of the bandpass filter 305 can be fed to the anti-alias filter 307 to attenuate noise components above the nyquist sampling limit of the receive ADC 309 sufficiently to prevent those noise components from aliasing back into the operating frequency range of the touch controller 106 and to improve the signal-to-noise ratio (SNR). The output of the anti-alias filter 307 can be converted by the receive ADC 309 into a digital signal, which can be sent from the receive section 107 to the demodulation section 109 for further processing.

The frequency of the stimulation signals (and consequently the frequency of the generated touch signals) can affect the amount of noise in the touch signal. The noise can be from internal sources, external sources, or both. Noise can be generated internally by, e.g., feedback resistor Rfb of the transimpedence amplifier 303 and can vary according to a selected frequency. The gain Gtia of the amplifier 303 can vary with the selected frequency as follows, $G_{tia}=\omega_{stm} \cdot r_{fb} \cdot C_{sig}$, where ωstm=the stimulation signal frequency in radians; and rfb=the resistance of the feedback resistor Rfb. To keep the gain Gtia constant, resistor Rfb can be adjusted. For example, for a given target gain Gtia, if the stimulation signal frequency ωstm is decreased by a factor of 2, the feedback resistance rfb can be increased by a factor of 2 in order to maintain the target gain. Since internal noise introduced by the feedback resistor Rfb can be proportional to $\sqrt{r_{fb}}$ for a given signal bandwidth, the internal noise can generally be higher at lower stimulation signal frequencies. In contrast to internal noise, the amount of external noise introduced into the touch signal can be arbitrary and dependent on environmental conditions.

Certain frequencies can produce higher noise amounts than others. The sense channels 207 can operate to reduce noise in the touch signal and to reduce noise contributions from the sense channel components themselves. Higher noise amounts can result in higher power consumption because the components can operate a higher level to reduce more noise. Conversely, lower noise amounts can result in lower power consumption because the components can operate at a lower level to reduce less noise. As a result, the components' power consumption can be affected by the frequency. Accordingly, power requirements can be determined for various frequencies associated with corresponding noise levels, thereby avoiding higher power consumption during lower noise conditions.

Table 1 shows examples of the relationships of internal and external SNR parameters to frequency and bias current level as follows.

TABLE 1

Example SNR Relationships.

| Frequency | Bias Current Level | Internal SNR (dB) | Total SNR (dB) | SNR Headroom for external noise (NZ_HDRM) (dB) |
|---|---|---|---|---|
| FT_1 | IB_1 | 63 | 60 | 3 |
| FT_2 | IB_2 | 66 | 60 | 6 |
| FT_3 | IB_3 | 67 | 60 | 7 |
| FT_4 | IB_4 | 70 | 60 | 10 |

As shown in the table, the internal SNR can be known for a particular frequency (FT) and bias current level (IB) of a sense channel in the receive section of the touch controller. The SNR headroom for external noise (NZ_HDRM) can be calculated as the internal SNR minus the maximum allowable total SNR of the sense channel. In this example, the total SNR can be 60 dB. As such, in the absence of external noise, the frequency (FT_1) and the bias current level (IB_1) can be selected because the external noise SNR of 0 would be lower than the SNR headroom of 3 dB at this frequency and bias current level. Similarly, if an SNR headroom of 5 dB is acceptable, the frequency (FT_2) and the bias current level (IB_2) can be selected because the acceptable SNR headroom would be lower than the SNR headroom of 6 dB at this frequency and bias current level.

Power management LUT 354 can include data that can be used to manage power consumption of the components of the receive section 107. In the example of FIG. 3, the power management LUT 354 can include bias current adjustments to the amplifier 303, the bandpass filter 305, the anti-alias filter 307, and the receive ADC 309 that can be applied thereto during lower noise conditions, for example, so as to reduce power consumption to one or more of these components. Lower noise conditions can require less noise reduction and, hence, less noise reduction operation from the sense channels of the receive section 107.

Table 2 shows an example power management LUT 354 as follows,

TABLE 2

Power Management Lookup Table Example

| DPPC[0] | IADJ_TIA[0] | IADJ_BPF[0] | IADJ_AAF[0] | IADJ_ADC[0] |
| DPPC[1] | IADJ_TIA[1] | IADJ_BPF[1] | IADJ_AAF[1] | IADJ_ADC[1] |
| . | . | . | . | . |
| . | . | . | . | . |
| . | . | . | . | . |
| DPPC[n] | IADJ_TIA[n] | IADJ_BPF[n] | IADJ_AAF[n] | IADJ_ADC[n] | where DPPC=the numerical control input to the receive NCO that can represent a phase increment proportional to the touch signal frequency; IADJ_TIA=the bias current adjustment for the transimpedence amplifier; IADJ_BPF=the bias current adjustment for the bandpass filter; IADJ_AAF=the bias current adjustment for the anti-alias filter; and IADJ_ADC=the bias current adjustment for the analog-to-digital converter.

In an example, the LUT 354 can include n entries, where n=13, and where the phase increment (DPPC) can be 1024 to 13312 at increments of 1024 with corresponding touch signal frequencies from 62.5 kHz to 812.5 kHz at increments of 62.5 kHz. For example, at an identified touch signal frequency of 62.5 kHz, the phase increment of 1024 can be found in the LUT 354 and the corresponding bias current adjustment values can be applied to the components of the receive section 107 to manage power consumption, e.g., to reduce the power to the components, while providing an acceptable touch signal quality.

Power management logic 145 can control which entry in the LUT 354 to select to manage power consumption of the receive section 107. At a particular touch signal frequency, the power management logic 145 can identify the phase increment and select the corresponding bias current adjustments from the LUT 354 to be applied to the components of the receive section 107 in order to manage their power consumption.

In an example operation, the power management logic 145 can identify phase increment 364 corresponding to the incoming touch signal frequency and select from the LUT 354 the bias current adjustment to be made to one or more of the components in order to manage the power consumption of that component. The amplifier 303 can receive the touch signal and convert the touch signal to a voltage signal at a power level adjusted by bias current adjustment 313. The bandpass filter 305 can receive the voltage signal and attenuate the signal noise at a power level adjusted by bias current adjustment 315. The anti-alias filter 307 can receive the bandpass-filtered signal and further attenuate the signal noise at a power level adjusted by bias current adjustment 317. The receive ADC 309 can receive the anti-aliased signal and convert the signal to a digital signal at a power level adjusted by bias current adjustment 319.

The bias current adjustments can be from low to high or any combination thereof, depending on the noise conditions and the noise reduction capabilities of the components. In some embodiments, there can be a noise threshold, for example at a given phase increment, which can define an upper limit of the amount of noise tolerable in the touch signal. As such, the bias current adjustments can be configured so as to allow noise to reach but not exceed that noise threshold. For example, it can be determined that the current to the bandpass filter can be adjusted to low for a given phase increment in order to reduce the filter's noise reduction operation while not exceeding the noise threshold.

For simplicity, FIG. 3 illustrates the details of one sense channel of the receive section. The receive section can have multiple sense channels with similar components. As such, the power management LUT can have a bias current adjustment for each component in each sense channel at each phase increment. The power management LUT can alternatively have the same bias current adjustment for corresponding components in the sense channels, e.g., the same bias current adjustment for all the amplifiers, at each phase increment. The power management LUT can alternatively have individual bias current adjustments for some components and the same bias current adjustments for other components at each phase increment The LUT can be updated dynamically to correspond to changing operating conditions. The LUT can also be updated prior to operation for static operating conditions.

In an alternate embodiment, the power management LUT 354 can include bias current adjustments based on the SNR headroom of the external noise. Table 3 shows an example power management LUT 354 as follows,

TABLE 3

| Power Management Lookup Table Example. | | | | |
|---|---|---|---|---|
| NZ_HDRM[0] | IADJ_TIA[0] | IADJ_BPF[0] | IADJ_AAF[0] | IADJ_ADC[0] |
| NZ_HDRM[1] | IADJ_TIA[1] | IADJ_BPF[1] | IADJ_AAF[1] | IADJ_ADC[1] |
| . | . | . | . | . |
| . | . | . | . | . |
| . | . | . | . | . |
| NZ_HDRM[n] | IADJ_TIA[n] | IADJ_BPF[n] | IADJ_AAF[n] | IADJ_ADC[n] |

Figure 4:
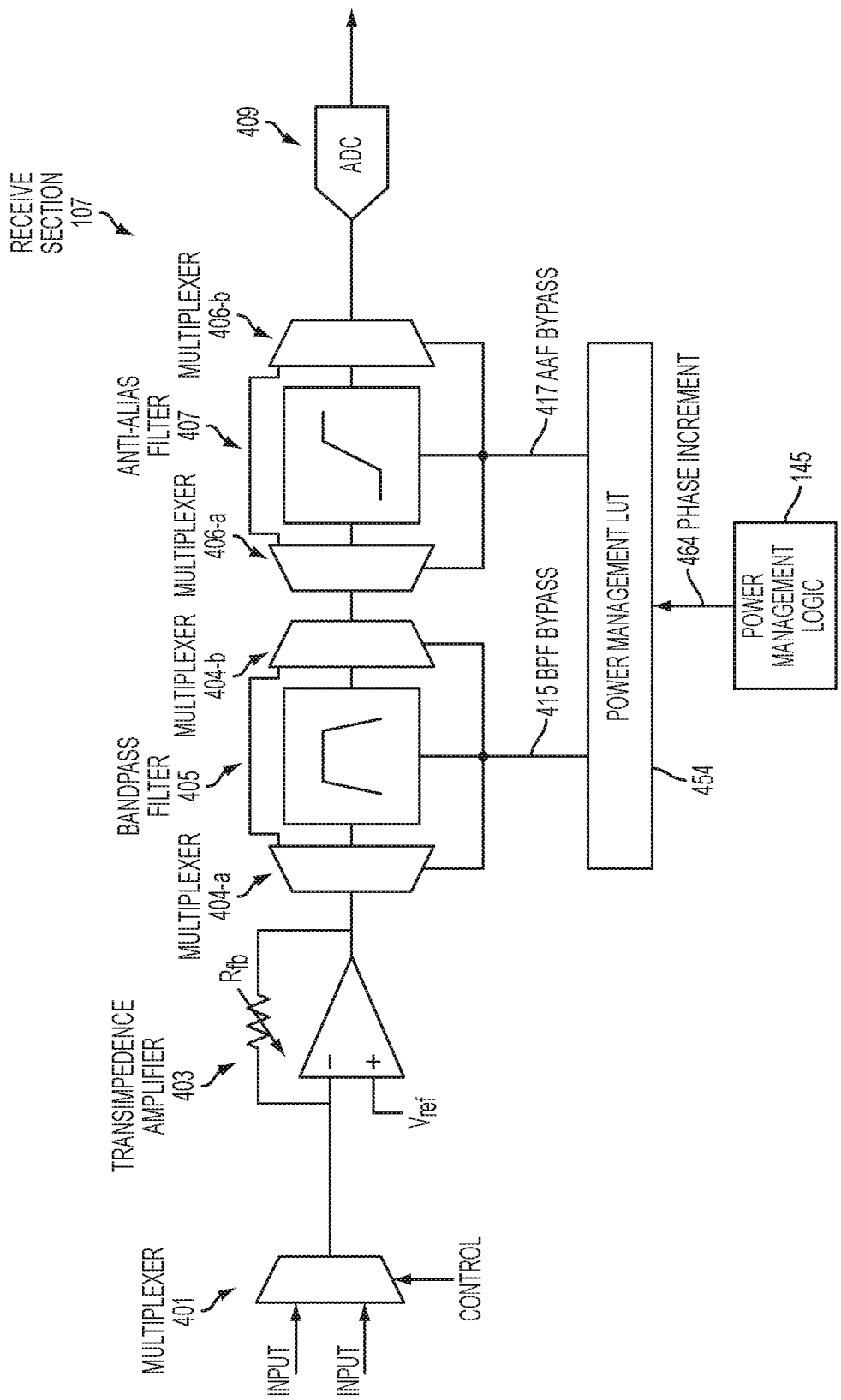
FIG. 4 illustrates another exemplary receive section of a touch controller having power management according to various embodiments.

FIG. 4 illustrates another exemplary receive section of a touch controller having power management according to various embodiments. FIG. 4 illustrates the details of one of the sense channels 207 in the receive section 107 of the touch controller 106. In the example of FIG. 4, receive section 107 of touch controller 106 can include sense channel 207 having multiplexer 401, transimpedence amplifier (TIA) 403, bandpass filter (BPF) 405, anti-alias filter (AAF) 407, and analog-to-digital converter (ADC) 409. The operation of these components can be similar to those in FIG. 3. In the example of FIG. 4, the sense channel can also include multiplexers 404-a, 404-b, 406-a, and 406-b. The multiplexers 404-a and 404-b can select whether to bypass the bandpass filter 405 or to allow the bandpass filter to process the voltage signal from the amplifier 403. The bandpass filter 405 can receive a command to power down if bypassed. The multiplexers 406-a and 406-b can select whether to bypass the anti-alias filter 407 or to allow the anti-alias filter to process either the outputted signal from the bandpass filter 405 or the signal that bypassed the bandpass filter. The anti-alias filter 407 can receive a command to power down if bypassed.

Power management LUT 454 can include data that can be used to manage power consumption of the components of the receive section 107. In the example of FIG. 4, the power management LUT 354 can include bypass commands to the bandpass filter 405 and the anti-alias filter 407 that can be applied thereto during lower noise conditions so as to reduce power consumption to either or both of these components. Lower noise conditions can require less noise reduction and, hence, less noise reduction operation from the sense channels of the receive section 107.

Table 4 shows an example power management LUT 454 as follows,

TABLE 4

| Power Management Lookup Table Example | | |
|---|---|---|
| DPPC[0] | BYP_BPF[0] | BYP_AFF[0] |
| DPPC[1] | BYP_BPF[1] | BYP_AFF[1] |
| . | . | . |
| . | . | . |
| . | . | . |
| DPPC[n] | BYP_BPF[n] | BYP_AFF[n] | where DPPC=the numerical control input to the receive NCO that can represent a phase increment proportional to the touch signal frequency; BYP_BPF=the bypass command for the bandpass filter; and BYP_AAF=the bypass command for the anti-alias filter.

Power management logic 145 can control which entry in the LUT 454 to select to manage power consumption of the receive section 107. At a particular touch signal frequency, the power management logic 145 can identify the phase increment (DPPC) and select the corresponding bypass commands from the LUT 454 to be applied to the components of the receive section 107 in order to manage their power consumption.

In an example operation, the power management logic 145 can identify phase increment 464 corresponding to the incoming touch signal frequency and select from the LUT 454 the bypass command to be made to either or both the bandpass filter 405 and the anti-alias filter 407 in order to manage the power consumption of that component. The amplifier 403 can receive the touch signal and convert the touch signal to a voltage signal. The bandpass filter 405 and the multiplexers 404-a and 404-b can receive bypass command 415. If the bypass command 415 is to bypass and power down the bandpass filter 405, the multiplexers 404-a and 404-b can bypass the bandpass filter with the voltage signal from the amplifier 403 and the bandpass filter can power down. If the bypass command 415 is not to bypass and power down the bandpass filter 405, the multiplexer 404-a can transmit the voltage signal from the amplifier 403 to the bandpass filter to attenuate the signal noise and the multiplexer 404-b can transmit the bandpass-filtered signal from the bandpass filter. The anti-alias filter 407 and the multiplexers 406-a and 406-b can receive bypass command 417. If the bypass command 417 is to bypass and power down the anti-alias filter 407, the multiplexers 406-a and 406-b can bypass the anti-alias filter with the incoming signal and the anti-alias filter can power down. If the bypass command 417 is not to bypass and power down the anti-alias filter 407, the multiplexer 406-a can transmit the incoming signal to the anti-alias filter to further attenuate the signal noise and the multiplexer 406-b can transmit the anti-aliased signal from the anti-alias filter. The receive ADC 409 can convert the incoming signal to a digital signal.

The bypass commands can be one on and one off, both off, or both on, depending on the noise conditions and the noise reduction capabilities of the components. In some embodiments, there can be a noise threshold, for example at a given phase increment, which can define an upper limit of the amount of noise tolerable in the touch signal. As such, the bypass commands can be configured to either on or off so as to allow noise to reach but not exceed that noise threshold. For example, it can be determined that the bandpass filter can be bypassed and powered down for a given phase increment in order to reduce the filter's noise reduction operation while not exceeding the noise threshold.

For simplicity, FIG. 4 illustrates the details of one sense channel of the receive section. The receive section can have multiple sense channels with similar components. As such, the power management LUT can have a bypass command for each component in each sense channel for each phase increment. The power management LUT can alternatively have the same bypass command for corresponding components in the sense channels, e.g., the same bypass command for all the bandpass filters, for each phase increment. The power management LUT can alternatively have individual bypass commands for some components and the same bypass commands for other components for each phase increment.

Figure 5:
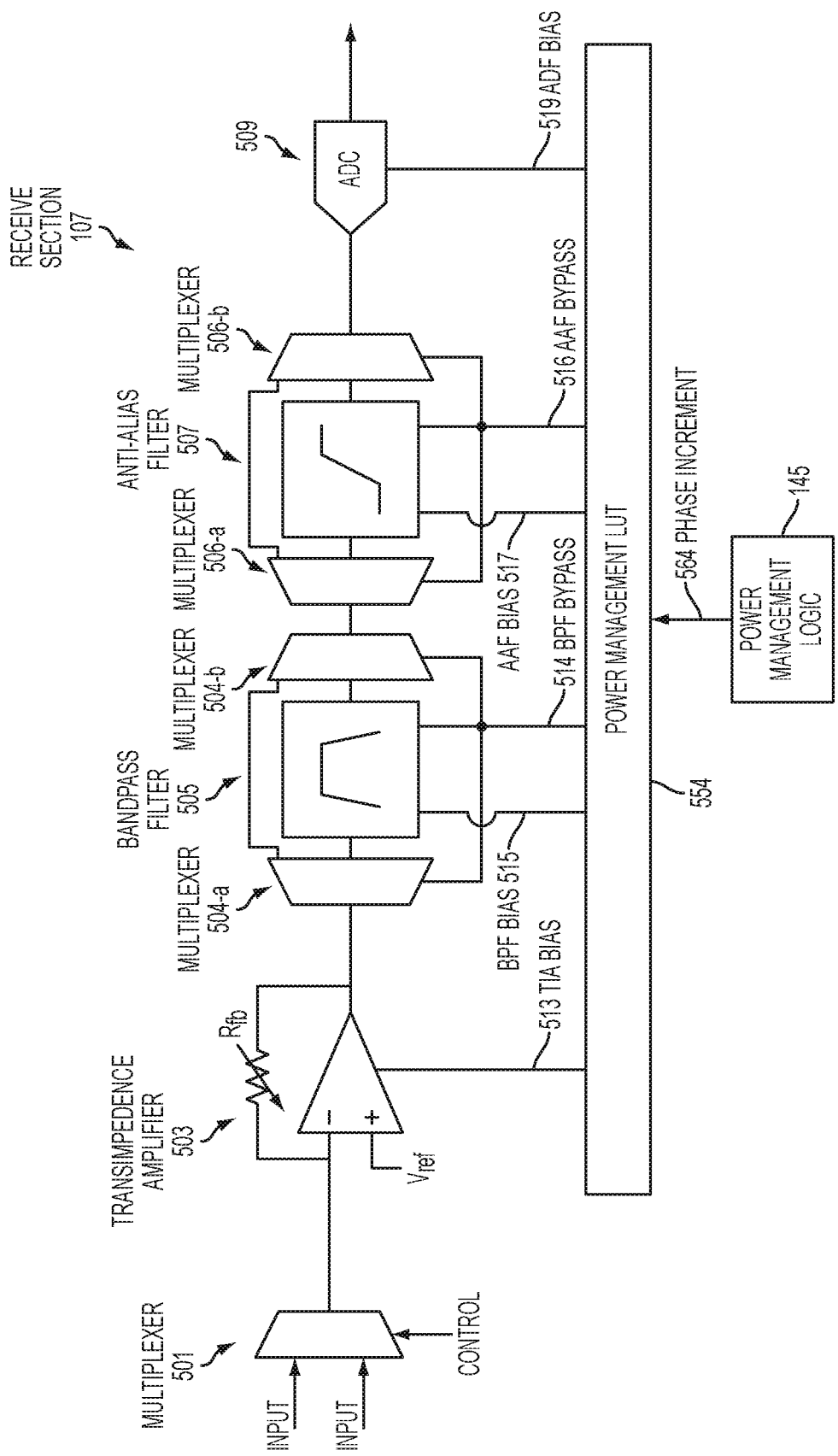
FIG. 5 illustrates still another exemplary receive section of a touch controller having power management according to various embodiments.

FIG. 5 illustrates still another exemplary receive section of a touch controller having power management according to various embodiments. FIG. 5 illustrates the details of one of the sense channels 207 in the receive section 107 of the touch controller 106. In the example of FIG. 5, receive section 107 of touch controller 106 can include the components of FIGS. 3 and 4 and their respective bias current adjustments and bypass commands. The operation of these components can be similar to that in FIGS. 3 and 4.

Power management LUT 554 can include data that can be used to manage power consumption of the components of the receive section 107. In the example of FIG. 5, the power management LUT 554 can include bias current adjustments to the amplifier 503, the bandpass filter 505, the anti-alias filter 507, and the receive ADC 509, and bypass commands to the bandpass filter 305 and the anti-alias filter 307 that can be applied thereto during lower noise conditions so as to reduce power consumption to one or more of these components. Lower noise conditions can require less noise reduction and, hence, less noise reduction operation from the sense channels of the receive section 107.

Table 5 shows an example power management LUT 554 as follows,

TABLE 5

| Power Management Lookup Table Example | | | | | | |
|---|---|---|---|---|---|---|
| DPPC[0] | IADJ_TIA[0] | IADJ_BPF[0] | IADJ_AAF[0] | IADJ_ADC[0] | BYP_BPF[0] | BYP_AFF[0] |
| DPPC[1] | IADJ_TIA[1] | IADJ_BPF[1] | IADJ_AAF[1] | IADJ_ADC[1] | BYP_BPF[1] | BYP_AFF[1] |
| . | . | . | . | . | . | . |
| . | . | . | . | . | . | . |
| . | . | . | . | . | . | . |
| DPPC[n] | IADJ_TIA[n] | IADJ_BPF[n] | IADJ_AAF[n] | IADJ_ADC[n] | BYP_BPF[n] | BYP_AFF[n] | where DPPC=the numerical control input to the receive NCO that can represent a phase increment proportional to the touch signal frequency; IADJ_TIA=the bias current adjustment for the transimpedence amplifier; IADJ_BPF=the bias current adjustment for the bandpass filter; IADJ_AAF=the bias current adjustment for the anti-alias filter; IADJ_ADC=the bias current adjustment for the analog-to-digital converter; BYP_BPF=the bypass command for the bandpass filter; and BYP_AAF=the bypass command for the anti-alias filter.

Power management logic 145 can control which entry in the LUT 554 to select to manage power consumption of the receive section 107. At a particular touch signal frequency, the power management logic 145 can identify the phase increment (DPPC) and select the corresponding bias current adjustments and bypass commands from the LUT 554 to be applied to the components of the receive section 107 in order to manage their power consumption.

In an example operation, the power management logic 145 can identify phase increment 564 corresponding to the incoming touch signal frequency and select from the LUT 554 the bias current adjustment and the bypass command to be made by the components in order to manage the power consumption of that component. The amplifier 503 can receive the touch signal and convert the touch signal to a voltage signal at a power level adjusted by bias current adjustment 513. The bandpass filter 505 and the multiplexers 504-a and 504-b can receive bypass command 514. If the bypass command 514 is to bypass and power down the bandpass filter 505, the multiplexers 504-a and 504-b can bypass the bandpass filter with the voltage signal from the amplifier 503 and the bandpass filter can power down. If the bypass command 514 is not to bypass and power down the bandpass filter 505, the multiplexer 504-a can transmit the voltage signal from the amplifier 503 to the bandpass filter to attenuate the signal noise at a power level adjusted by bias current adjustment 515 and the multiplexer 404-b can transmit the bandpass-filtered signal from the bandpass filter. The anti-alias filter 507 and the multiplexers 506-a and 506-b can receive bypass command 516. If the bypass command 516 is to bypass and power down the anti-alias filter 507, the multiplexers 506-a and 506-b can bypass the anti-alias filter with the incoming signal and the anti-alias filter can power down. If the bypass command 516 is not to bypass and power down the anti-alias filter 507, the multiplexer 506-a can transmit the incoming signal to the anti-alias filter to further attenuate the signal noise at a power level adjusted by bias current adjustment 517 and the multiplexer 506-b can transmit the anti-aliased signal from the anti-alias filter. The receive ADC 509 can convert the incoming signal to a digital signal at a power level adjusted by bias current adjustment 519.

The bias current adjustments can be from low to high or any combination thereof, depending on the noise conditions and the noise reduction capabilities of the components. The bypass commands can be one on and one off, both off, or both on, depending on the noise conditions and the noise reduction capabilities of the components. In some embodiments, there can be a noise threshold, for example at a given phase increment, which can define an upper limit of the amount of noise tolerable in the touch signal. As such, the bias current adjustments and the bypass commands can be configured so as to allow noise to reach but not exceed that noise threshold. For example, it can be determined that the bandpass filter can be bypassed and powered down and the current to the anti-alias filter reduced for a given phase increment in order to reduce their noise reduction operation while not exceeding the noise threshold.

For simplicity, FIG. 5 illustrates the details of one sense channel of the receive section. The receive section can have multiple sense channels with similar components. As such, the power management LUT can have a bias current adjustment and/or bypass command for each component in each sense channel for a given phase increment. The power management LUT can alternatively have the same bias current adjustments and/or bypass commands for corresponding components in the sense channels, e.g., the same bias current adjustment can be used for all the amplifiers, for a given phase increment. The power management LUT can alternatively have individual bias current adjustments and/or bypass commands for some components and the same bias current adjustments and/or bypass commands for other components for a given phase increment.

It is to be understood that the components, configuration, and operation of the receive section is not limited to those illustrated in FIGS. 3 through 5, but can include other and/or additional components, configurations, and/or operations capable of power management according to various embodiments.

It is further to be understood that, although the example LUTs use phase increments, other data associated with the touch signal frequency can also be used.

In additional or alternative to frequency, other factors can affect the amount of noise in the touch signal. For example, the temperature of touch components can affect the amount of noise. Higher temperatures can introduce higher noise amounts. Higher temperatures can result in higher power consumption because the components can operate at a higher level to reduce more noise. Conversely, lower temperatures can result in lower power consumption because the components can operate at a lower level to reduce less noise. As a result, the components' power consumption can also be affected by the temperature. Accordingly, power requirements can be determined for various temperatures associated with corresponding noise levels, thereby avoiding higher power consumption during lower noise conditions.

Table 6 shows an example power management LUT, similar to LUT 554, in which the bias current adjustments and bypass commands can be a function of temperature as follows.

TABLE 6

Power Management Lookup Table Example

| TEMP[0] | IADJ_TIA[0] | IADJ_BPF[0] | IADJ_AAF[0] | IADJ_ADC[0] | BYP_BPF[0] | BYP_AFF[0] |
|---|---|---|---|---|---|---|
| TEMP[1] | IADJ_TIA[1] | IADJ_BPF[1] | IADJ_AAF[1] | IADJ_ADC[1] | BYP_BPF[1] | BYP_AFF[1] |
| . | . | . | . | . | . | . |
| . | . | . | . | . | . | . |
| . | . | . | . | . | . | . |
| TEMP[n] | IADJ_TIA[n] | IADJ_BPF[n] | IADJ_AAF[n] | IADJ_ADC[n] | BYP_BPF[n] | BYP_AFF[n] | where TEMP=the temperature of the touch components (or the ambient temperature); IADJ_TIA=the bias current adjustment for the transimpedence amplifier; IADJ_BPF=the bias current adjustment for the bandpass filter; IADJ_AAF=the bias current adjustment for the anti-alias filter; IADJ_ADC=the bias current adjustment for the analog-to-digital converter; BYP_BPF=the bypass command for the bandpass filter; and BYP_AAF=the bypass command for the anti-alias filter. Other power management LUTs based on temperature can be used, similar to LUTs 354 and 454. The LUT can have a set of entries applicable to all the sense channel components, individual entries applicable to individual components, or a combination of the two.

In some embodiments, the power management LUT can be a function of both frequency and temperature. That is, bias current adjustments and/or bypass commands can be determined for a given frequency at a given temperature.

In some embodiments, the power management LUT can be a function of low noise frequency analysis, also known as spectral analysis. During spectral analysis, noise signals can be detected from touch components and analyzed at different frequencies to determine the noise magnitude. The lower noise magnitudes can indicate lower noise at those particular frequencies, which can be deemed low noise frequencies. These low noise frequencies can consequently be used for stimulation signals that can drive the associated touch sensor panel to generate touch signals based on touch or near touch on the panel, thereby reducing the amount of noise in the touch signals. These lower noise frequencies can result in lower power consumption because the components can operate at a lower level to reduce less noise. As a result, the components' power consumption can be affected by the low noise frequencies. Accordingly, power requirements can be determined for various low noise frequencies associated with corresponding noise levels, thereby avoiding higher power consumption during lower noise conditions.

The power management LUTs 354, 454, and 554 can be used for power management based on low noise frequency analysis. For example, the power management logic 145 can identify the low noise frequency being used, determine the corresponding phase increment, and select the corresponding bias current adjustments and/or bypass commands from the LUTs 354, 454, and 554 to be applied to the components of the receive section 107 in order to manage their power consumption. Alternatively, power management LUTs, similar to LUTs 354, 454, and 554, can include the low noise frequencies, rather than the phase increments, and corresponding bias current adjustments and/or bypass commands.

In some embodiments, the power management LUT can be a function of frequency, temperature, and low noise frequency analysis. That is, bias current adjustments and/or bypass commands can be determined for a given frequency based on low noise frequency analysis at a given temperature.

In some embodiments, if a particular value identified by the power management logic can not be matched to the power management LUT, the power management logic can select the closest LUT entry or a default LUT entry. The power management logic can generate an error message that a LUT entry could not be applied, in which case, the touch components can operate at either current or default power levels.

In some embodiments, the power management LUT can be replaced with a state machine, which can be partially or entirely included in or separate from the power management logic. The state machine can dynamically adjust the bias current of and/or bypass the sense channel components based on a phase increment, for example. The state machine can also dynamically adjust the bias current of and/or bypass the sense channel components based on the amount of noise detected during the low noise frequency analysis. For example, the state machine can receive a noise input, compare the input to a noise threshold, and dynamically adjust the bias current of and/or bypass the sense channel components based on whether the noise exceeds the noise threshold. The state machine can also instruct the low noise frequency analyzer to select different low noise frequencies and/or to adjust the stimulation signal frequencies based on whether the noise exceeds the noise threshold.

In some embodiments, the power management LUT can be used in combination with a state machine, which can be partially or entirely included in or separate from the power management logic. For example, the LUT can include ranges of bias current adjustments from low to high for the sense channel components. The state machine can select which adjustment within the range to use based on certain conditions.

Other and/or additional configurations are also possible for determining the power management parameters to be applied to touch components, depending on the needs of the system.

Figure 6:
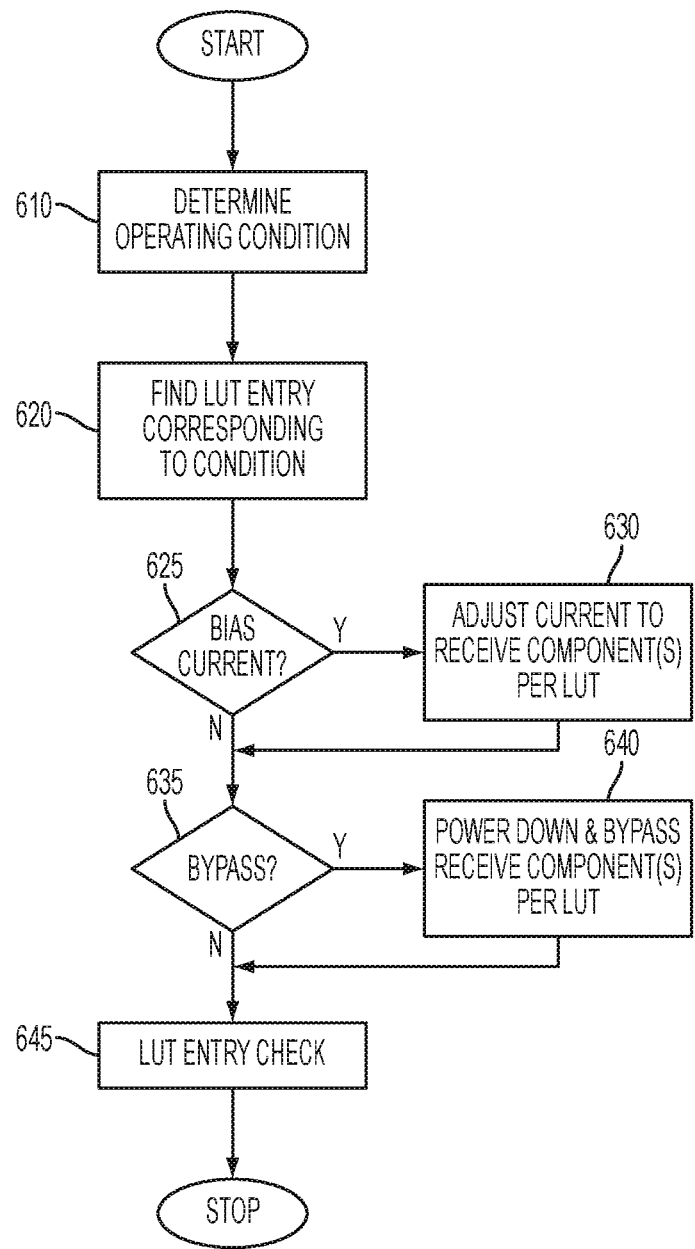
FIG. 6 illustrates an exemplary method for power management of a receive section of a touch controller according to various embodiments.

FIG. 6 illustrates an exemplary method for power management of a receive section of a touch controller according to various embodiments. In the example of FIG. 6, current operating conditions of sense channel components in the receive section of a touch controller can be determined (610). For example, it can be determined at what frequency and temperature the components currently operate, whether noise has been detected in the components and at what level, and so on. Entries in a power management LUT corresponding to one or more of the determined conditions can be selected (620). If the entries include bias current adjustments, the power level of the affected sense channel components can be adjusted based on these adjustments (625, 630). If the entries include bypass commands, the affected sense channel components can be bypassed and powered down based on these commands (635, 640). If no entries are found to correspond to the determined operating conditions, an interrupt flag can be set to notify an associated processor that no corresponding entries were found and the components can continue operating at current conditions (645). Alternatively, the processor can intervene. In some embodiments, when no corresponding entries are found, the closest entries or default entries can be used.

Figure 7:
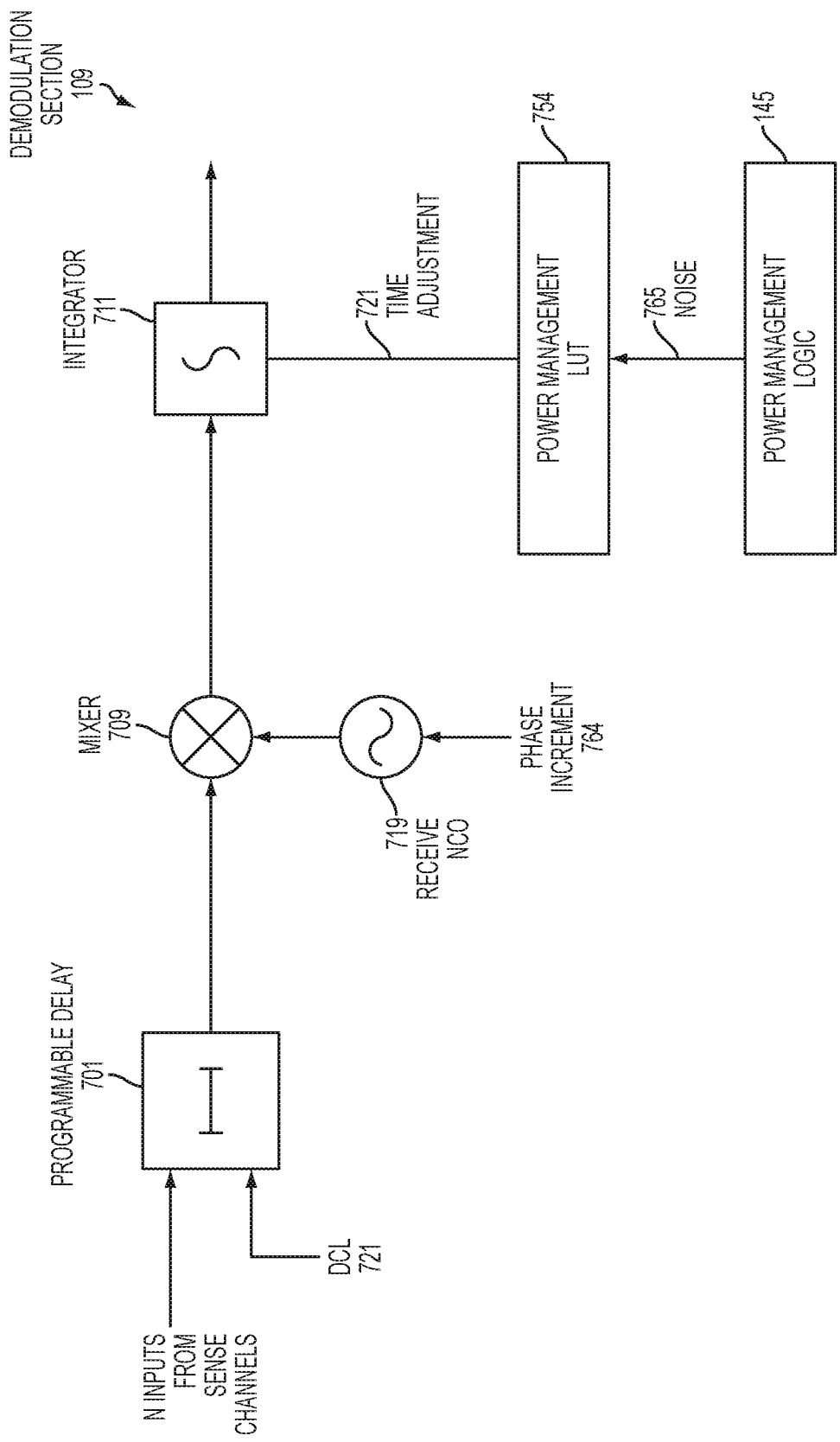
FIG. 7 illustrates an exemplary demodulation section of a touch controller having power management according to various embodiments.

FIG. 7 illustrates an exemplary demodulation section of a touch controller having power management according to various embodiments. In the example of FIG. 7, demodulation section 109 of touch controller 106 can include digital demodulator 213 having programmable delay 701, mixer 709, receive NCO 719, and integrator 711. The programmable delay 701 can adjust the phase of a touch signal received from a sense channel in the receive section 107 of the touch controller 106 to correct for delays caused by various components of the system using a component DCL 721, which can represent a sum of the system delays affecting the sense channels. The phase-adjusted touch signal can be fed to the mixer 709 to multiply the phase-adjusted signal with a demodulation signal generated by the receive NCO 719 based on the numerical control input phase increment 764. In some embodiments, the demodulation signal can be an envelope shaped digitally synthesized sine wave and the demodulator 213 can have a bandpass filter response. The envelope (or window) of the synthesized sine wave can be selected to reduce the stopband ripple of the bandpass filter response of the demodulator 213. Windows such as a rectangular, Chebychev, Gaussian, etc., waveform can be used, depending on the frequency response desired. The demodulated signal from the mixer 709 can be fed to the integrator 711 to be integrated to form the composite touch signals, which can be stored in the result memory 215 for further processing.

The integration time of the integrator 711 can affect the amount of noise in the touch signal. Since noise, such as white noise, can scale with the square root of integration time, the longer the integration time, the lower the noise effect in the touch signal. However, longer integration time can mean longer operation of the receive section to provide touch signals for integration. Longer operation can in turn mean higher power consumption. As a result, the components' power consumption can also be affected by the integration time. An objective of the demodulation section 109 can be to output an acceptable touch signal quality. Therefore, the digital demodulator can balance the noise effect against the power consumption when there is higher signal noise. For example, touch components can experience both internal and external noise, which can typically be tolerated at a level of about 0.8% root mean square (RMS) of the touch signal, each noise contributing about 0.4%

RMS, while still providing an acceptable touch signal quality. Therefore, where there is little or no external noise, the internal noise introduced by the touch components can be allowed to increase to about 0.8% RMS by reducing the integration time of the integrator 711. Where there is little or no internal or external noise, the integration time can also be reduced with little or no noise changes. Accordingly, power requirements can be determined for various integration times associated with corresponding noise levels, thereby avoiding higher power consumption during lower noise conditions.

Power management LUT 754 can include data that can be used to manage power consumption of the components of the demodulation section 109. In the example of FIG. 7, the power management LUT 754 can include integration time adjustments to the integrator 711 that can be applied so as to reduce power consumption by the integrator and consequently power consumption by the sense channels in the receive section of the touch controller.

Table 7 shows an example power management LUT 754 as follows,

TABLE 7

| Power Management Lookup Table Example | |
|---|---|
| NZ[0] | TADJ_INT[0] |
| NZ[1] | TADJ_INT[1] |
| . | . |
| . | . |
| . | . |
| NZ[n] | TADJ_INT[n] | where NZ=the detected noise in the touch signals; and TADJ_INT=the integration time adjustments to the integrator.

Power management logic 145 can control which entry in the LUT 754 to select to manage power consumption in the demodulation section 109. The power management logic 145 can select the integration time adjustment from the LUT 754 based on the detected noise. In addition or as an alternative to detected noise, the LUT 754 can include other parameters associable with the noise to correspond to integration time adjustments, e.g., phase increment, temperature, low noise frequency analysis, and so on. The power management logic 145 can then find these parameters in the LUT 754 and select their corresponding integration time adjustments.

In an example operation, the power management logic 145 can acquire the detected noise amount and select the corresponding integration time adjustment from the LUT 754 to be made to the integrator 711 in order to manage its power consumption. The integrator 711 can receive demodulated touch signals from the mixer 709 and integrate the signals for the time period adjusted by the integration time adjustment 721.

For simplicity, FIG. 7 illustrates the details of one digital demodulator of the demodulation section. The demodulation section can have multiple demodulators with similar components. As such, the power management LUT can have an integration time adjustment for each demodulator's integrator at each given noise amount. The power management LUT can alternatively have the same integration time adjustment for all the integrators at each given noise amount. The power management LUT can alternatively have individual integration time adjustments for some integrators and shared integration time adjustments for others at each given noise amount.

It is to be understood that the components, configuration, and operation of the demodulation section is not limited to those illustrated in FIG. 7, but can include other and/or additional components, configurations, and/or operations capable of power management according to various embodiments.

As previously described, the power management LUT can be replaced with a state machine or can be used in combination with a state machine according to various embodiments.

Figure 8:
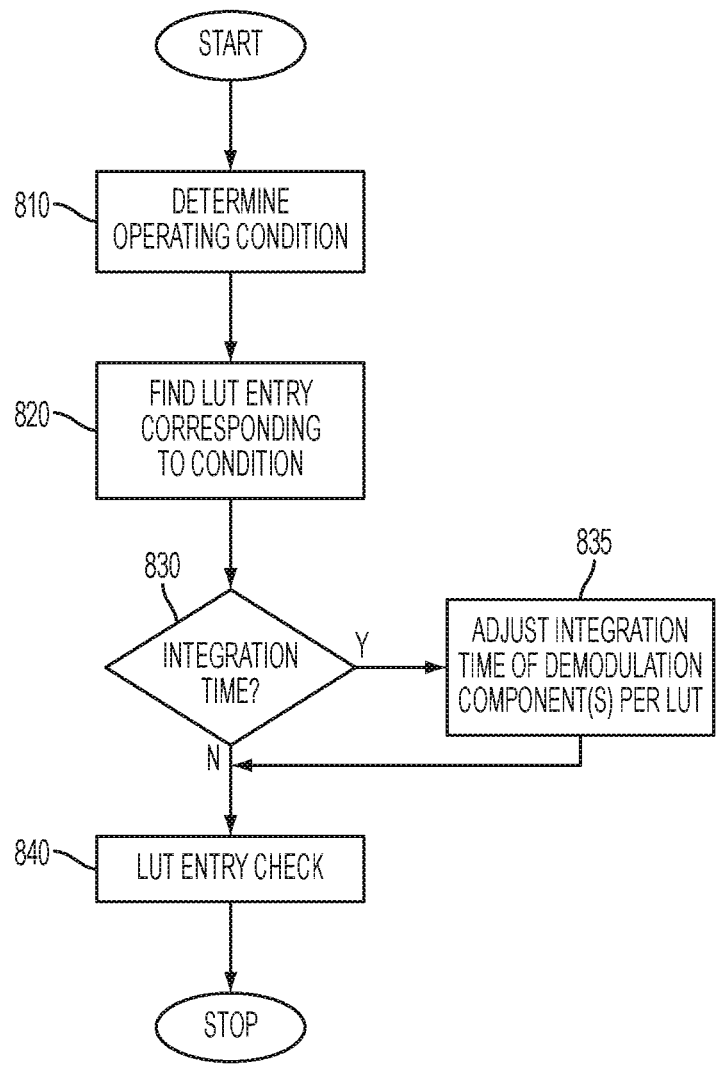
FIG. 8 illustrates an exemplary method for power management of a demodulation section of a touch controller according to various embodiments.

FIG. 8 illustrates an exemplary method for power management of a demodulation section of a touch controller according to various embodiments. In the example of FIG. 8, current operating conditions of digital demodulator components in the demodulation section of a touch controller can be determined (810). For example, a detected noise level in the touch signals can be determined. Alternatively, the frequency and temperature at which the components currently operate can be determined. Entries in a power management LUT corresponding to one or more of the determined conditions can be selected (820). If the entries include integration time adjustments, the integration time of the integrator can be adjusted based on the adjustments (830, 835). If no entries are found to correspond to the determined operating conditions, an interrupt flag can be set to notify an associated processor that no corresponding entries were found and the components can continue operating at current conditions (840). Alternatively, the processor can intervene. In some embodiments, when no corresponding entries are found, the closest entries or default entries can be used.

Figure 9:
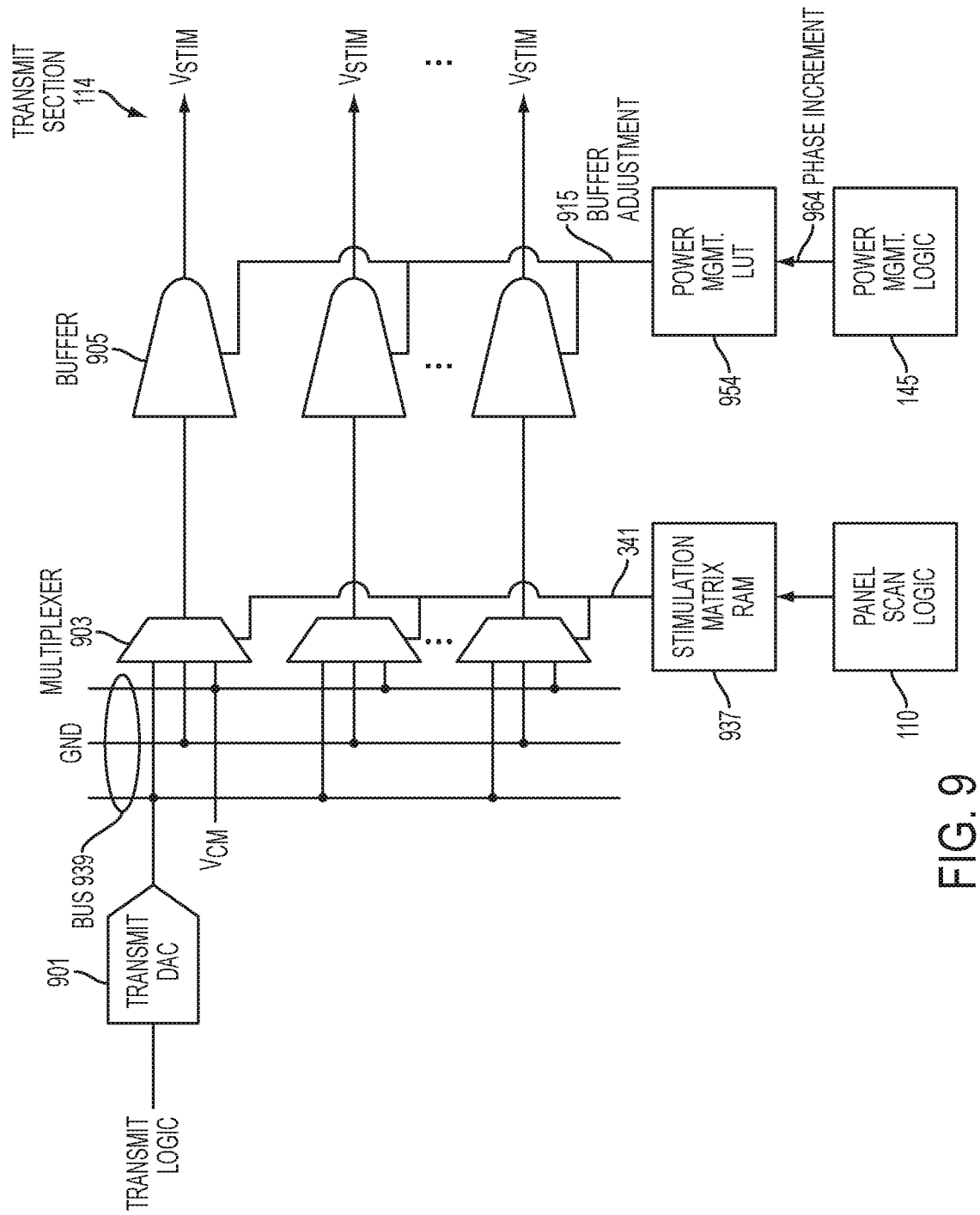
FIG. 9 illustrates an exemplary transmit section of a touch controller having power management according to various embodiments.

FIG. 9 illustrates an exemplary transmit section of a touch controller having power management according to various embodiments. In the example of FIG. 9, transmit section 114 of touch controller 106 can include transmit digital-to-analog converter (DAC) 901 and drive channels 233 that can each include analog multiplexer 903 and buffer 905. The transmit DAC 901 can convert digital signals from the transmit logic into stimulation signals Vstim to supply to separate lines of bus 939. Vstim can be a positive (+) phase signal Vstim+ having a waveform at the same frequency as the transmit NCO. Vstim can also be a negative (−) phase signal Vstim− having the same waveform as Vstim+ inverted about a common voltage Vcm. The bus 939 can also include a line carrying the common voltage Vcm and a line that is grounded, gnd. The multiplexer 903 of the drive channel can connect to each line of the bus 939 and can select one of the drive signals, Vstim+, Vstim−, Vcm, or gnd, to supply the corresponding buffer 905. The multiplexer 903 can select the drive signal based on the stimulation matrix in stimulation matrix RAM 937. The stimulation matrix can indicate which drive signal is to be applied to which drive line of the associated touch sensor panel to stimulate the drive lines for touch or near touch detection. The panel scan logic 110 can modify the stimulation matrix. The buffer 905 of the channel can gain up the signal from the transmit DAC 901 and provide the drive capability to drive the mostly capacitive load presented to the buffer 905 by the touch sensor panel.

The frequency of the stimulation signals can affect the slew rate of the buffers and consequently the touch signal quality. Higher frequencies can produce higher slew rates. An objective of the drive channels in the transmit section 114 can be to output stable stimulation signals to the associated touch sensor panel such that resultant touch signal quality is acceptable. Therefore, the drive channels can operate to reduce the buffer slew rate. The components' power consumption can also be affected by the frequency.

Accordingly, power requirements can be determined for various frequencies associated with corresponding slew rates, thereby avoiding higher power consumption when not needed.

Power management LUT 954 can include data that can be used to manage power consumption of the components of the transmit section 114. In the example of FIG. 9, the power management LUT 954 can include slew rate adjustments to the buffers 905 that can be applied during higher frequencies so as to reduce power consumption to the buffers.

Table 8 shows an example power management LUT 954 as follows,

TABLE 8

Power Management Lookup Table Example

| DPPC[0] | SRADJ_BUF[0] |
| DPPC[1] | SRADJ_BUF[1] |
| . | . |
| . | . |
| . | . |
| DPPC[n] | SRADJ_BUF[n] | where DPPC=the numerical control input to the transmit NCO that can represent a phase increment proportional to the stimulation signal frequency; and SRADJ_BUF=the slew rate adjustments for the buffer.

For simplicity, the power management LUT shows entries for only one buffer. However, the transmit section can include multiple buffers. As such, the power management LUT can have individual slew rate adjustments for each buffer for each phase increment (DPPC). The power management LUT can alternatively have the same slew rate adjustments for all the buffers for each phase increment. The power management LUT can alternatively have individual slew rate adjustments for some buffers and shared slew rate adjustments for others for each phase increment.

Power management logic 145 can control which entry in the LUT 954 to select to manage power consumption of the transmit section 114. At a particular stimulation signal frequency, the power management logic 145 can identify the phase increment and select the corresponding slew rate adjustments from the LUT 954 to be applied to the buffers of the transmit section 114 in order to manage power consumption.

In an example operation, the power management logic 145 can identify phase increment 964 corresponding to the stimulation signal frequency and select from the LUT 954 the slew rate adjustment to be made to the buffer 905. The multiplexer 903 can select one of the lines of the bus 939 based on data from the stimulation matrix stored in the stimulation matrix RAM 937 and transmit the corresponding signal on the selected line to the buffer. The buffer 905 can receive the signal from the multiplexer 903 and further prepare the signal at a power level adjusted by slew rate adjustment 915 for transmission to drive lines of the associated touch sensor panel. The slew rate adjustments can be from nil to low to high or any combination thereof, depending on the needs of the components.

As an added benefit, the slew rate adjustments can also affect the noise in the stimulation signals. For example, reducing the slew rate can reduce the signal noise. Reducing the stimulation signal frequency in order to reduce slew rate can also reduce signal noise.

It is to be understood that the components, configuration, and operation of the transmit section is not limited to those illustrated in FIG. 9, but can include other and/or additional components, configurations, and/or operations capable of power management according to various embodiments.

As described previously, the power management LUT can be replaced with a state machine or can be used in combination with a state machine according to various embodiments.

Figure 10:
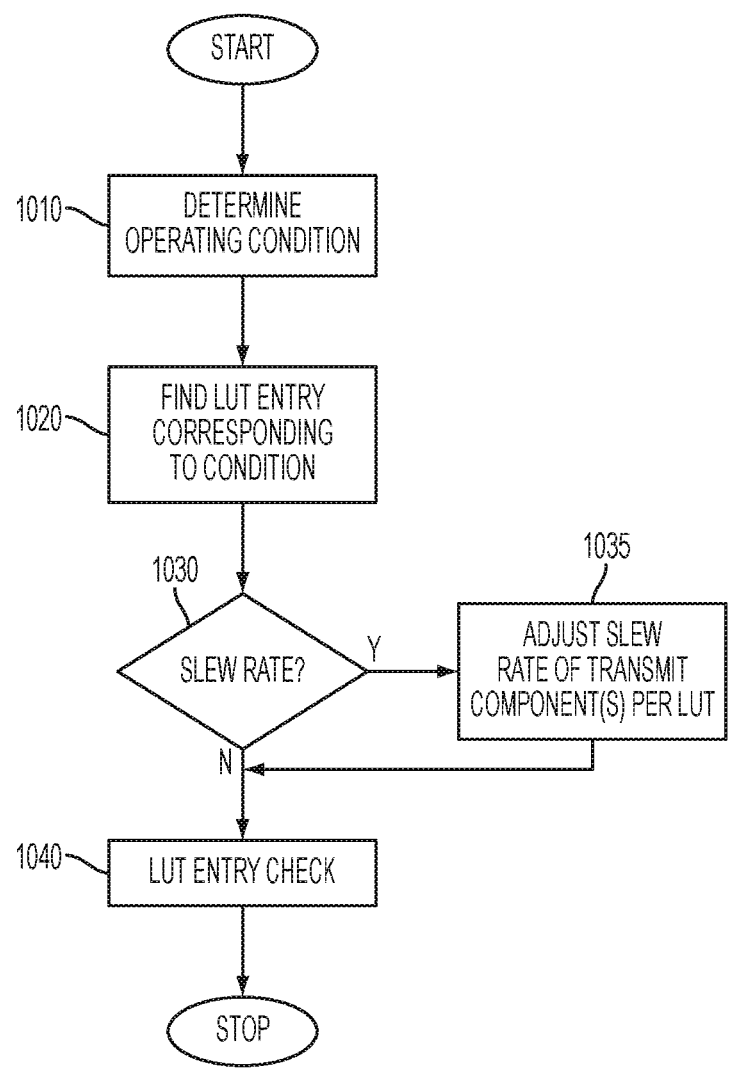
FIG. 10 illustrates an exemplary method for power management of a transmit section of a touch controller according to various embodiments.

FIG. 10 illustrates an exemplary method for power management of a transmit section of a touch controller according to various embodiments. In the example of FIG. 10, current operating conditions of components in the transmit section of a touch controller can be determined (1010). For example, at what frequency the components currently operate can be determined. Alternatively, the temperature or noise level can be determined. Entries in a power management LUT corresponding to one or more of the determined conditions can be selected (1020). If the entries include slew rate adjustments, the buffers can be adjusted based on the slew rate adjustments (1030, 1035). If no entries are found to correspond to the determined operating conditions, an interrupt flag can be set to notify an associated processor that no corresponding entries were found and the components can continue operating at current conditions (1040). Alternatively, the processor can intervene. In some embodiments, when no corresponding entries are found, the closest entries or default entries can be used.

Figure 11:
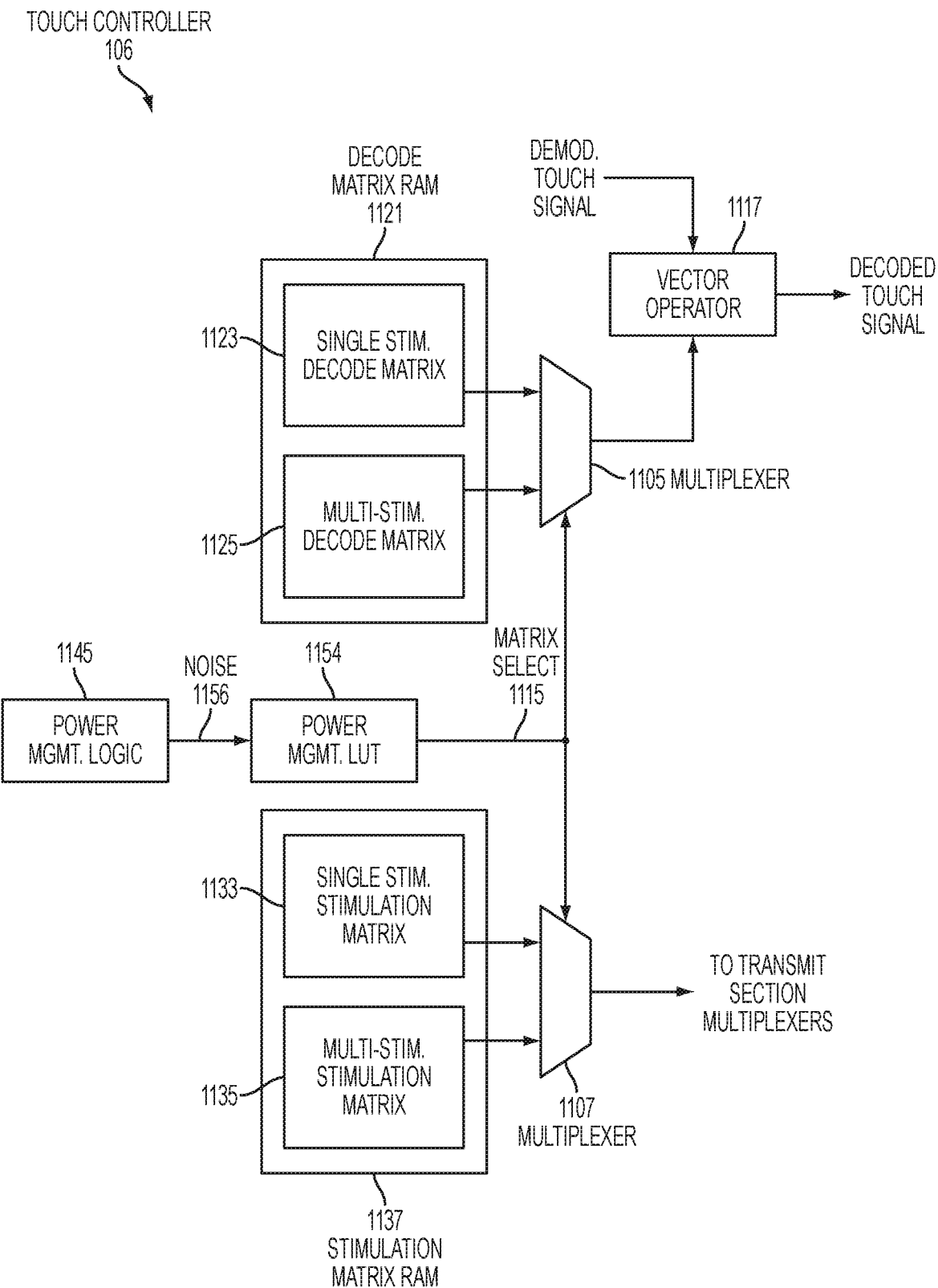
FIG. 11 illustrates an exemplary memory section of a touch controller having power management according to various embodiments.

FIG. 11 illustrates an exemplary memory section of a touch controller having power management according to various embodiments. In the example of FIG. 11, a memory section of touch controller 106 can include decode matrix RAM 1121, which can include single stimulation decode matrix 1123 and multi-stimulation decode matrix 1125, multiplexer 1105 coupled to the decode matrix RAM, stimulation matrix RAM 1137, which can include single stimulation stimulation matrix 1133 and multi-stimulation stimulation matrix 1135, and multiplexor 1107 couple to the stimulation matrix RAM. The decode matrix RAM 1121 can connect to vector operator 1117 of demodulation section 109 of the touch controller 106 to provide data to the vector operator for decoding generated touch signals. The stimulation matrix RAM 1137 can connect to the transmit section multiplexors (such as multiplexor 903 in FIG. 9) of the touch controller 106 to provide data to the transmit section multiplexors for generating stimulation signals to drive the associated touch sensor panel. The decode matrices 1123, 1125 can be inverses of the stimulation matrices 1133, 1135, respectively. The single stimulation decode matrix 1123 can be used to decode touch signals generated based on stimulation signals associated with the single stimulation stimulation matrix 1133, where the stimulation signals were applied to one drive line at a time of the associated touch sensor panel. The multi-stimulation decode matrix 1125 can be used to decode touch signals generated based on stimulation signals from the multi-stimulation stimulation matrix 1135, where the stimulation signals were applied simultaneously to multiple drive lines of the associated touch sensor panel. The multiplexer 1105 can select which matrix 1123 or 1125 to provide to the vector operator 1117. The multiplexer 1107 can select which matrix 1133 or 1135 to provide to the transmit section multiplexors. Typically, the decode matrix can be selected based on the selection of the stimulation matrix. For example, selection of the single stimulation stimulation matrix 1133 can result in selection of the single stimulation decode matrix 1123.

Generally, single stimulation can have lower power consumption than multi-stimulation because only one drive line can be stimulated at a time. However, single stimulation can produce lower SNR because the generated touch signal cannot be integrated over multiple drive lines. Therefore, selection between the multi-stimulation decode and stimulation matrix combination and the single stimulation decode and stimulation matrix combination can be done to balance power savings with noise reduction.

Power management LUT 1154 can include data that can be used to select which decode matrix to apply to the vector operator 1117 of the demodulation section 109 and which stimulation matrix to apply to the transmit section of the touch controller. Table 9 shows an example power management LUT 1154 as follows.

TABLE 9

Power Management Lookup Table Example

| NZ[0] | STM_DMX[0] |
| NZ[1] | STM_DMX[1] |
| . | . |
| . | . |
| . | . |
| NZ[n] | STM_DMX[n] | where NZ=the detected noise in the touch signals; and STM_DMX=the combination of stimulation matrix and decode matrix to apply.

Power management logic 145 can control which entry in the LUT 1154 to select. The power management logic 145 can select the matrix combination from the LUT 1154 based on the detected noise. In addition or as an alternative to detected noise, the LUT 1154 can include other parameters associable with the noise to correspond to the matrix selection, e.g., phase increment, temperature, low noise frequency analysis, and so on. The power management logic 145 can then find these parameters in the LUT 1154 and select the corresponding matrix combination.

In an example operation, the power management logic 145 can acquire the detected noise amount and select the corresponding matrix selection from the LUT 1154. The LUT 1154 can send a selection signal to the multiplexer 1105 to select the appropriate decode matrix from the decode matrix RAM 1121 and to the multiplexor 1107 to select the appropriate stimulation matrix from the stimulation matrix RAM 1137. The selected decode matrix can be applied to the vector operator 1117 and the selected stimulation matrix can be applied to the transmit section.

As previously described, the LUT can be replaced with a state machine or used in combination with a state machine according to various embodiments.

It is to be understood that the components, configuration, and operation of the memory section is not limited to those illustrated in FIG. 11, but can include other and/or additional components, configurations, and/or operations capable of power management according to various embodiments.

Figure 12:
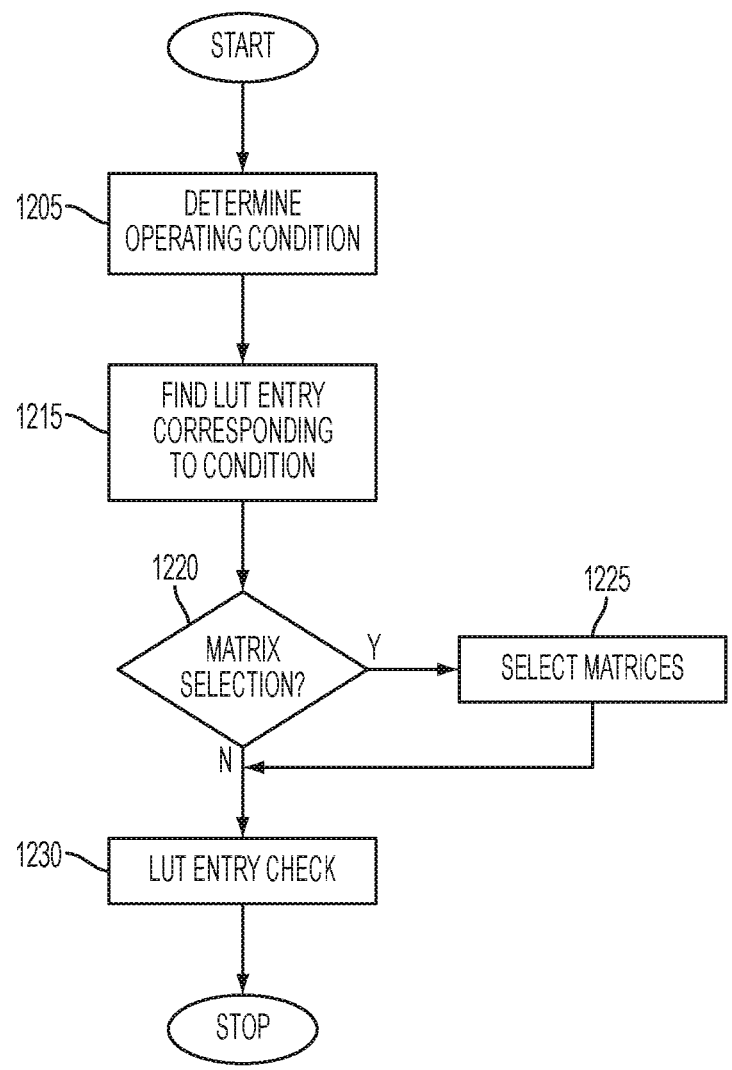
FIG. 12 illustrates an exemplary method for power management of a memory section of a touch controller according to various embodiments.

FIG. 12 illustrates an exemplary method for power management of a memory section of a touch controller according to various embodiments. In the example of FIG. 12, current operating conditions of components in the memory section of a touch controller can be determined (1205). For example, the detected noise level can be determined. Alternatively, the frequency and temperature the components at which currently operate can be determined. Entries in a power management LUT corresponding to one or more of the determined conditions can be selected (1215). If the entries include matrix selection, the selected decode matrix and the selected stimulation matrix can be applied (1220, 1225). If no entries are found to correspond to the determined operating conditions, an interrupt flag can be set to notify an associated processor that no corresponding entries were found and the components can continue operating at current conditions (1230). Alternatively, the processor can intervene. In some embodiments, when no corresponding entries are found, the closest entries or default entries can be used.

Figure 13B:
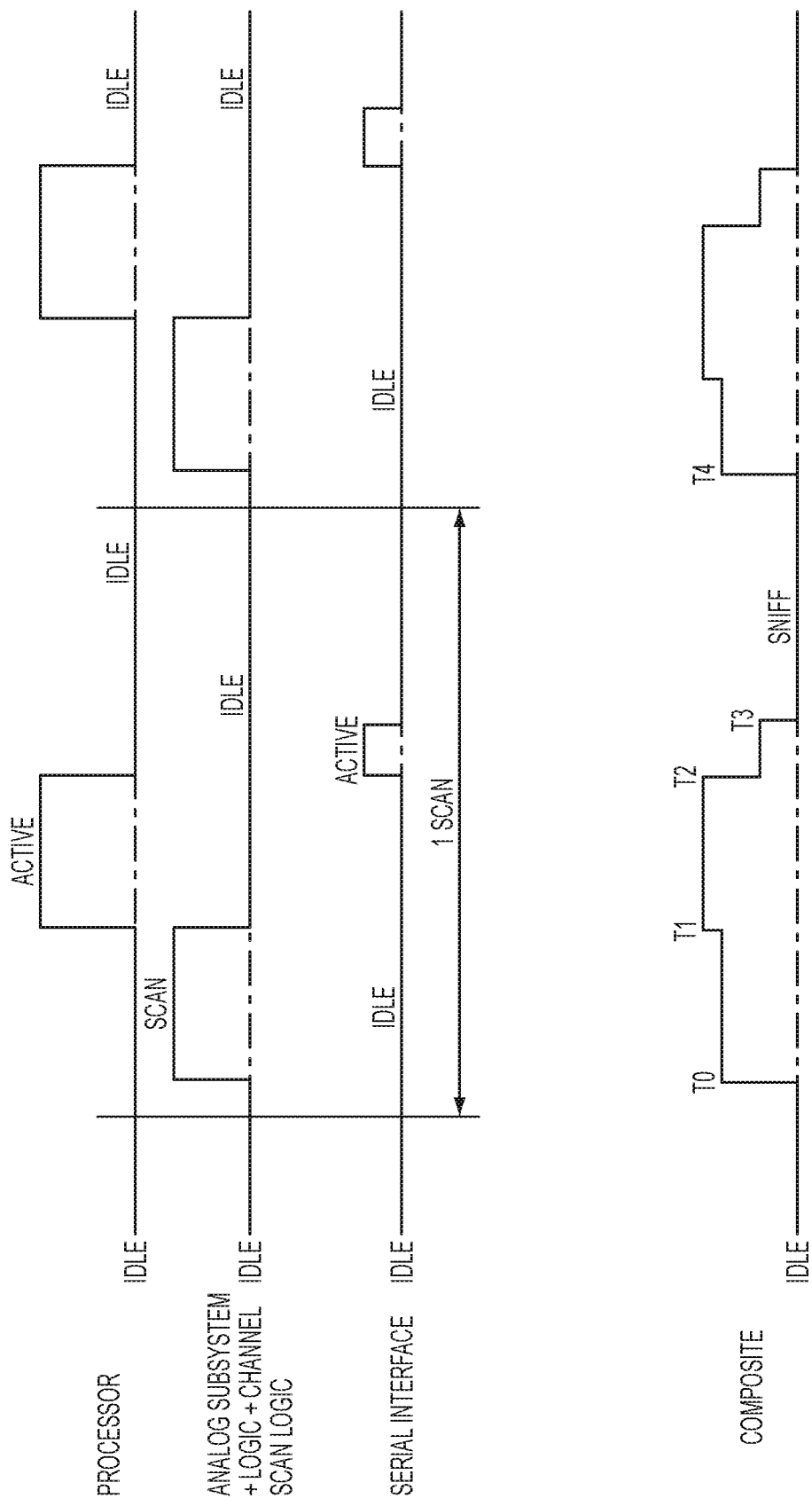

FIGS. 13a-13e illustrate exemplary power diagrams for operating modes of a system having touch controller power management according to various embodiments. A touch system can have at least the following three operating modes: active mode, ready mode, and auto-scan mode. FIG. 13a illustrates an exemplary power diagram for an active mode without power management. Example power diagrams of individual subsystems are shown. An example total composite power diagram, which is the sum of the individual subsystems' power diagrams, is also shown. Example individual subsystems can include a processor, an analog subsystem including associated logic (e.g. demodulation logic and panel scan logic), and a serial interface. Other subsystems can be included as well. As shown in the composite power diagram, at time T0, the processor can become active to initiate a touch sensor panel scan. At time T1, the processor can transition into a WFI (Wait For Interrupt) state, while the channel scan logic and the analog subsystem can actively perform a panel scan. Upon completion of the panel scan, at time T2, the analog subsystems can transition into an idle state, where the analog subsystems' power consumption can be nearly or close to zero and the processor can wake up to process the data acquired during the panel scan. After the processor has completed the data processing at time T3, the processor can transition into the WFI state and initiate transfer of the processed data via the serial interface to a host processor. At time T4, data transfer can be completed and the serial interface can be turned off. Another panel scan can begin at time T5. Power consumption during this active mode can be comparable to the processor's WFI power consumption level.

FIG. 13b illustrates an exemplary power diagram for an active mode with power management. Similar to FIG. 13a, example power diagrams for the subsystems and the composite are shown. Prior to time T0, the system can be in a sniff state. The sniff state power consumption can be much lower than the WFI power consumption because, in the sniff state, the system's high frequency oscillator and all associated clocks can be off. In order for the sniff state to be viable for the active mode, the power management logic can ensure that the transition time of the touch system from the active state to the sniff state is smaller than the time the system is in an idle state. This can allow the total current of the entire subsystem to drop low, e.g., below 100 μA in some embodiments. In contrast, the WFI power consumption can be higher, e.g., 10 mA in some embodiments. At time T0, the channel scan logic can wake up and perform a touch sensor panel scan autonomously, without intervention from the processor. At time T1, the analog subsystem and panel scan logic can be turned off and the processor can transition into an active state. The processor can then process the data acquired by the panel scan logic. Upon completion, the processor can turn off at time T2 and transfer the processed data to the host processor via the serial interface. At time T3, the touch system can transition into a sniff state. At time T4, another panel scan can begin. Power consumption during this active mode with power management can be much lower than without power management.

FIG. 13c illustrates an exemplary power diagram for a ready mode without power management. This power diagram is similar to the active mode power diagram of FIG. 13a with the following exceptions. In the ready mode power diagram of FIG. 13c, the panel scan duration for one scan can be longer, e.g., 40 ms for ready mode compared to 16 ms for active mode in some embodiments. Additionally, in the ready mode power diagram of FIG. 13c, at time T4, the touch system can transition into sniff state in ready mode rather than into WFI state in active mode.

Figure 13D:
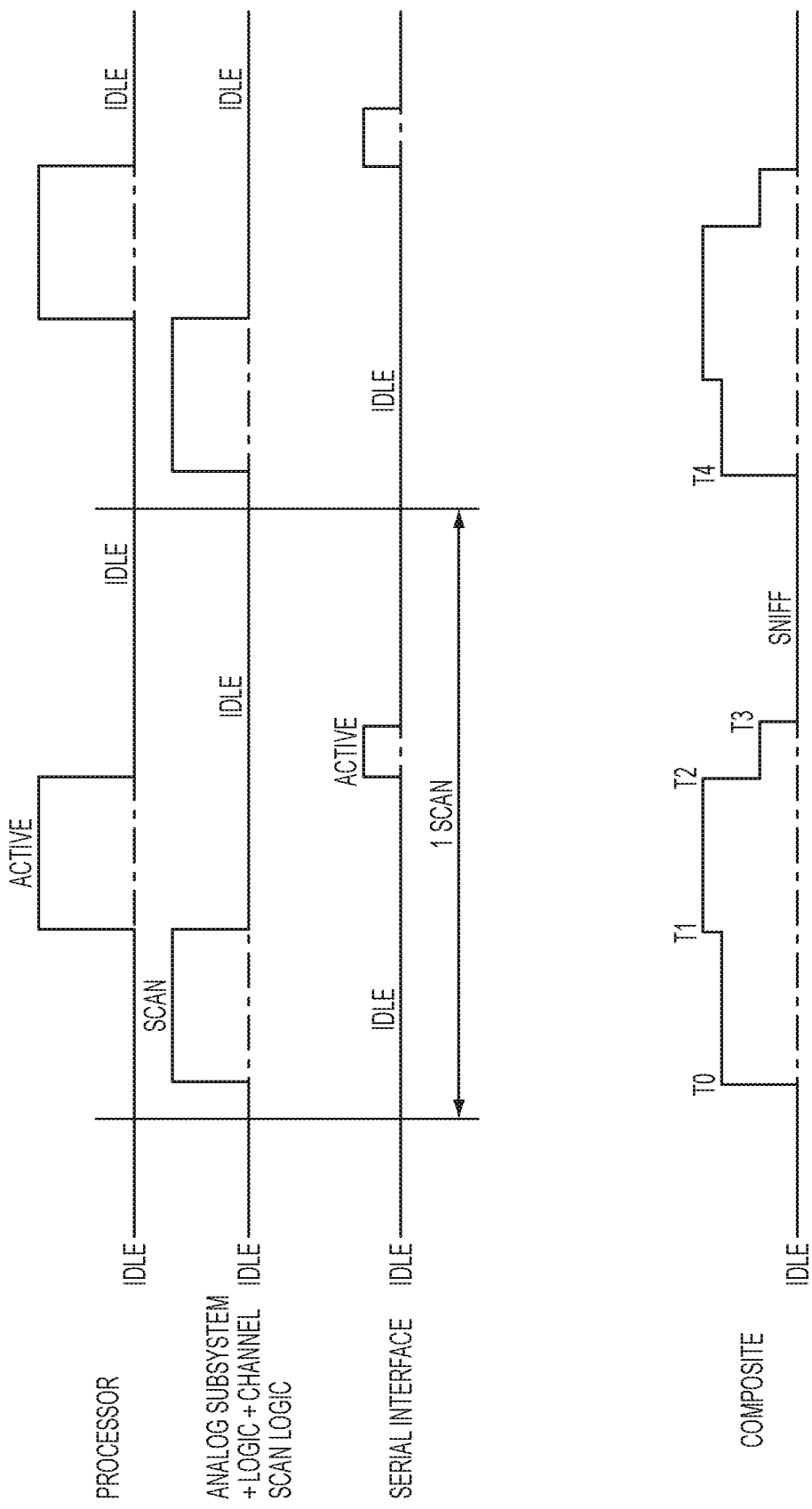

FIG. 13d illustrates an exemplary power diagram for a ready mode with power management. This power diagram can be similar to the active mode power diagram of FIG. 13b with the following exception. In the ready mode power diagram of FIG. 13d, the panel scan duration for one scan can be longer, e.g., 40 ms for ready mode compared to 16 ms for active mode. Power consumption during ready mode with power management can be much lower than without power management.

FIG. 13e illustrates an exemplary power diagram for auto-scan mode. At time T0, channel scan logic can initiate a touch presence scan that can check for a near touch or touch. The scan duration for the touch presence scan can typically be one scan step (as opposed to multiple scan steps in active mode) until time T1 and can indicate the presence but not the location of a near touch or touch. Another scan can begin at time T2. Because the scan duration can be much less than the scan duration during active and ready modes, power consumption can be much lower during auto-scan mode, thereby providing power management.

Figure 14:
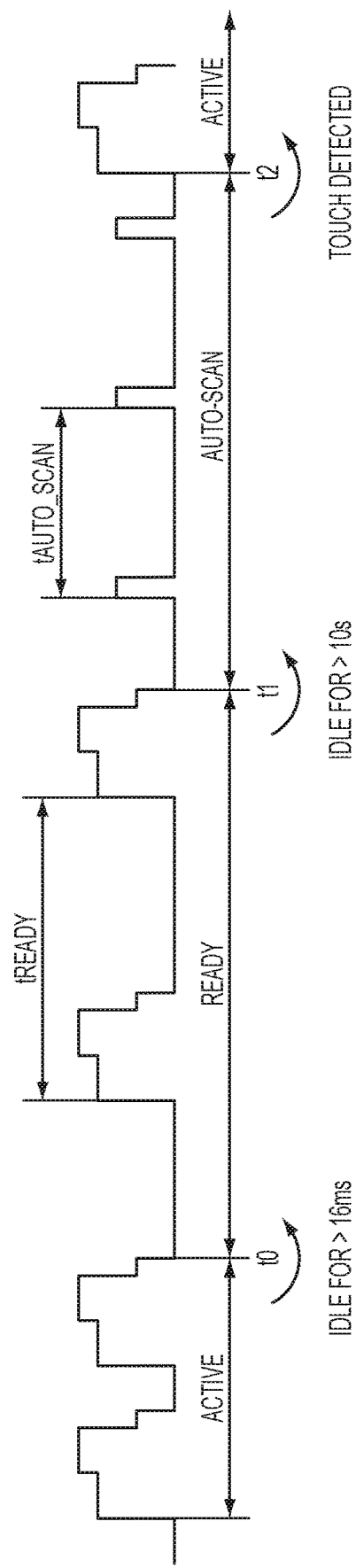
FIG. 14 illustrates an exemplary composite power diagram for operating modes of a system having touch controller power management according to various embodiments.

FIG. 14 illustrates an exemplary composite power diagram for a system having touch controller power management according to various embodiments. Power management logic can select different power modes for the touch system, depending on the presence of a near touch or touch condition and/or the idle time of the system. In the example of FIG. 14, the system can begin in active mode. If a touch or near touch has not been detected for a certain amount of time, e.g., 16 ms in some embodiments, at time t0, the system can transition into ready mode. During ready mode, the scan duration time t_ready can gradually increase with the idle time (i.e., the time when no touches or near touches are detected) to achieve even greater power savings until a second idle time has reached a certain duration, e.g., 10 s in some embodiments, at time t1. At time t1, the system can transition into auto-scan mode. During auto-scan mode, the scan duration time t auto-scan can similarly gradually increase with the idle time until a touch or near touch is detected at time t2. At time t2, the system can transition back into active mode to detect the touch or near touch. If a touch or near touch is detected, the system can transition from any low power mode (e.g., ready mode or auto-scan mode) into the active mode.

Figure 15:
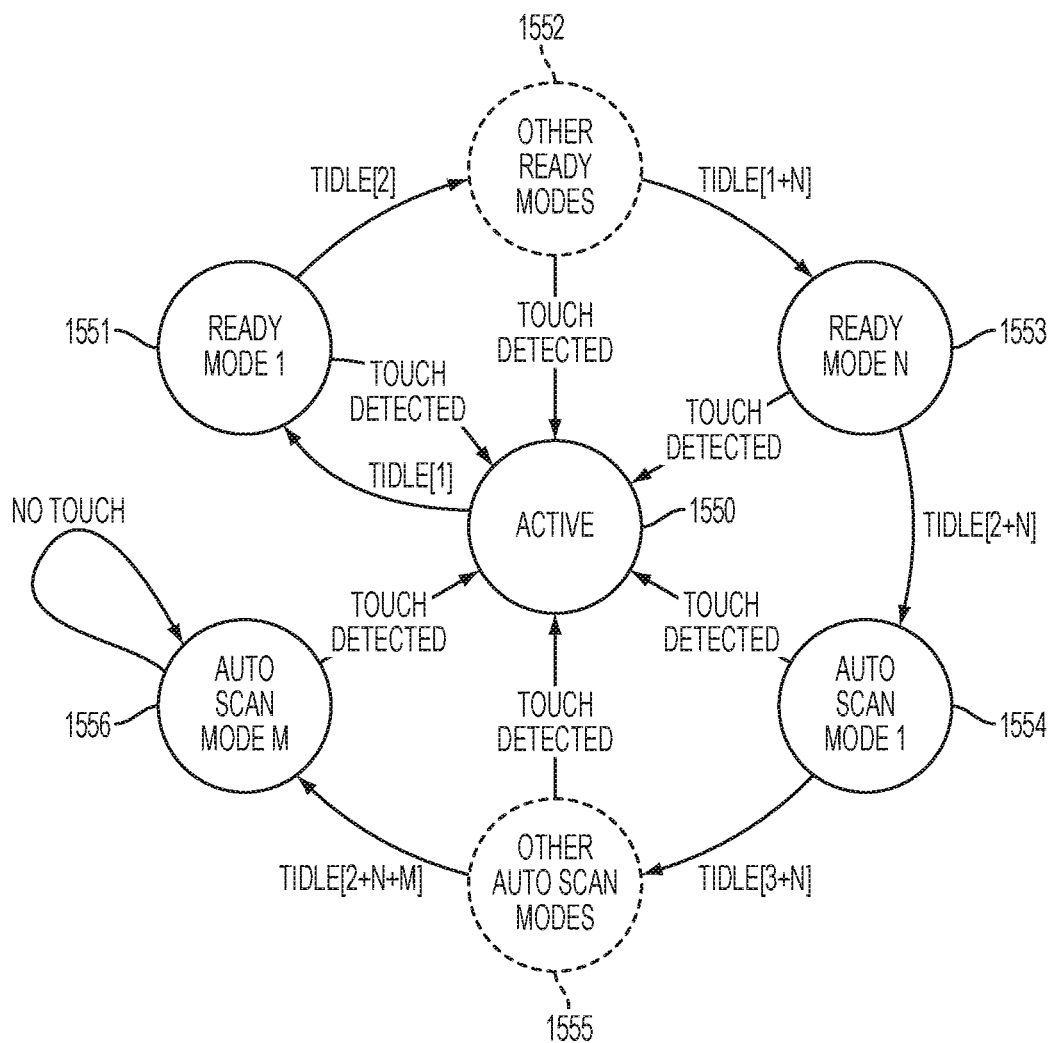
FIG. 15 illustrates an exemplary state diagram for power management during operating modes of a system having touch controller power management according to various embodiments.

FIG. 15 illustrates an exemplary state diagram for power management during operating modes of a system having touch controller power management according to various embodiments. In the example of FIG. 15, the touch system can be in an active state (1550) due to the presence of a near touch or touch condition. In the absence of a near touch or touch condition for more than idle period TIDLE[1], the system can transition into a ready mode state (1551) and after another idle period TIDLE[2] to other ready mode states (and so forth) with modified scan durations. The maximum scan durations can be a function of the particular application, e.g., an application in which touch images are acquired within a certain period without compromising the responsiveness and performance of the touch subsystem. In some applications, the scan duration in ready mode state N (1553) can be at a maximum, e.g., 50 ms, where N can be an integer. After the system has been idle for an extended time TIDLE[2+N], the system can transition into an auto-scan mode (1554) with progressively longer scan periods in states (1555) and can enter the final auto-scan mode state M (1556) in which the system can reside until a near touch or touch is detected, where M can be an integer. Any near touch or touch condition can cause the system to transition into active mode regardless of the current mode.

Table 10 shows an example listing of power modes and their associated idle time and scan duration parameters, for example, as illustrated in FIG. 15. The processor can initialize the table at start-up based on a given application or system requirements.

TABLE 10

Example idle times and scan durations for power modes

| Power State | Idle Time | Scan duration |
|---|---|---|
| Active | Tidle[1] | Tscan[1] |
| Ready_1 | Tidle[2] | Tscan[2] |
| ... | ... | ... |
| Ready_N | Tidle[2 + N] | Tscan[2 + N] |
| AutoScan_1 | Tidle3 + N] | Tscan[3 + N] |
| ... | ... | ... |
| AutoScan_M | Idle indefinitely | Tscan[3 + N + M] |

FIG. 16 illustrates an exemplary lookup table for touch controller power management according to various embodiments. The example LUT shows combinations of adjustments described in the previous tables. For example, for a given numerical control input (DPPC) condition or noise (NZ) condition or temperature (TEMP) condition, components can be adjusted to manage their power consumption according to various embodiments.

Although each entry in the example LUT shows only one condition and its corresponding adjustments, it is to be understood that multiple conditions can be combined for a particular adjustment. For example, a given numerical control input at a given noise level at a given temperature can cause a particular adjustment to a component, whereas, that given numerical control input at another give noise level at another given temperature can cause a different adjustment to that component. That is, the LUT can be multi-dimensional, depending on the numbers of relatable conditions.

Certain power management functions can be active on certain devices. As such, in some embodiments, a common power management LUT can be used for different devices with appropriate functions active and the remainder inactive. For example, a trackpad can have severe power supply noise, such that power management of its bandpass filter can be active. A digital media player can have both power supply noise and panel noise, such that power management of its bandpass filter and its transmit buffer can be active. A mouse can have no panel and no power supply noise, such that power management can be inactive. Additionally certain power management functions can be active for certain operating modes of a device.

Figure 17:
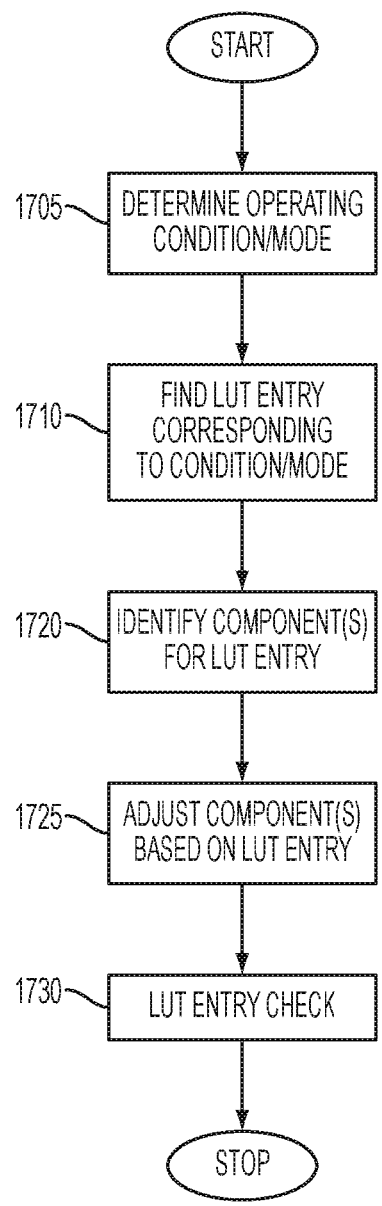
FIG. 17 illustrates an exemplary method for power management of a touch controller according to various embodiments.

FIG. 17 illustrates an exemplary method for power management of a touch controller according to various embodiments. In the example of FIG. 17, current operating conditions and/or operating modes of components in a touch controller can be determined (1705). For example, the detected noise level can be determined. Alternatively, the frequency and temperature at which the components currently operate can be determined, or the mode in which the components currently operate can be determined. Entries in a power management LUT corresponding to one or more of the determined conditions and/or modes can be selected (1710). Based on the LUT adjustments corresponding to the entries, the components to be adjusted can be identified (1720). The adjustments can be applied to the identified components to manage their power consumption (1725). If no entries are found to correspond to the determined operating conditions and/or operating modes, an interrupt flag can be set to notify an associated processor that no corresponding entries were found and the components can continue operating at current conditions and/or in the current modes (1730). Alternatively, the processor can intervene. In some embodiments, when no corresponding entries are found, the closest entries or default entries can be used.

Figure 18:
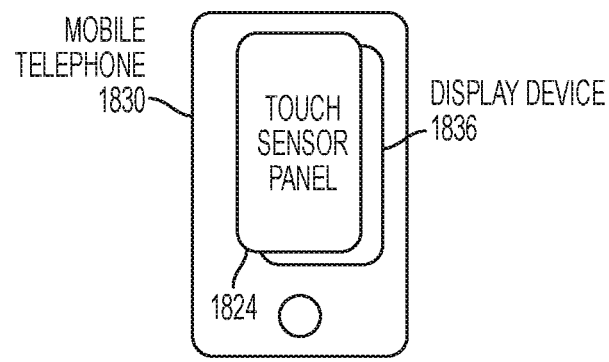
FIG. 18 illustrates an exemplary mobile telephone having touch controller power management according to various embodiments.

FIG. 18 illustrates an exemplary mobile telephone 1830 that can include touch sensor panel 1824, display 1836, and other computing system blocks that can have touch controller power management according to various embodiments.

Figure 19:
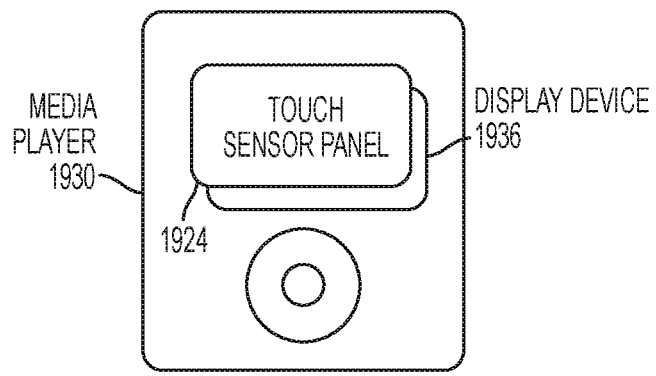
FIG. 19 illustrates an exemplary digital media player having touch controller management according to various embodiments.

FIG. 19 illustrates an exemplary digital media player 1930 that can include touch sensor panel 1924, display 1936, and other computing system blocks that can have touch controller power management according to various embodiments.

Figure 20:
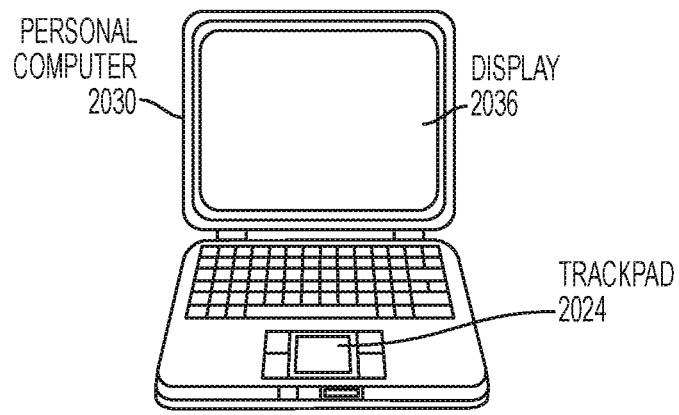
FIG. 20 illustrates an exemplary personal computer having touch controller power management according to various embodiments.

FIG. 20 illustrates an exemplary personal computer 2030 that can include touch sensor panel (trackpad) 2024, display 2036, and other computing system blocks that can have touch controller power management according to various embodiments.

The mobile telephone, media player, and personal computer of FIGS. 18 through 20 can realize power savings with a touch controller having power management according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. In a touch sensing system subject to external and internal noise, a method for selectively lowering power consumption, the method comprising:
    for a particular expected external noise level, selecting a particular stimulation signal frequency and bias current pair from a plurality of stored stimulation signal frequency and bias current pairs for applying to one or more sense channels;
    wherein the selected particular stimulation signal frequency and bias current pair has a lowest power consumption level at which a combination of an internal noise level associated with the selected stimulation signal frequency and bias current and the expected external noise level is within a predetermined allowable total noise level.

2. The method of claim 1, where the expected external noise level is an expected external signal-to-noise ratio (SNR), the internal noise level is an internal SNR, and the predetermined allowable total noise level is a predetermined allowable total SNR.

3. The method of claim 2, further comprising:
    computing an SNR headroom for external noise for each stimulation signal frequency and bias current pair by subtracting the predetermined allowable total SNR from the internal SNR associated with each stimulation signal frequency and bias current pair; and
    selecting the stimulation signal frequency and bias current pair having a smallest SNR headroom for external noise greater than the expected external SNR.

4. The method of claim 2, further comprising:
    computing an SNR headroom for external noise for each stimulation signal frequency and bias current pair by subtracting the predetermined allowable total SNR from the internal SNR associated with each stimulation signal frequency and bias current pair; and
    selecting the stimulation signal frequency and bias current pair having a smallest SNR headroom for external noise greater than an acceptable external SNR.

5. The method of claim 1, further comprising:
    computing an external noise margin for each stimulation signal frequency and bias current pair by subtracting the internal noise level from the predetermined allowable total noise level associated with each stimulation signal frequency and bias current pair; and
    selecting the stimulation signal frequency and bias current pair having a smallest external noise margin greater than the expected external noise level.

6. The method of claim 1, further comprising:
    computing an external noise margin for each stimulation signal frequency and bias current pair by subtracting the internal noise level from the predetermined allowable total noise level associated with each stimulation signal frequency and bias current pair; and
    selecting the stimulation signal frequency and bias current pair having the smallest external noise margin greater than an acceptable external noise level.

7. The method of claim 1, further comprising measuring the internal noise level for each of a plurality of stimulation signal frequency and bias current pairs to establish the internal noise level associated with each simulation signal frequency and bias current pair.

8. A touch sensing system, comprising:
    one or more sense channels;
    a memory containing a plurality of stored stimulation signal frequency and bias current pairs; and
    a processor coupled to the one or more sense channels and the memory, the processor programmed for
        selecting a particular stimulation signal frequency and bias current pair from the memory for applying to the one or more sense channels, the selected stimulation signal frequency and bias current pair having a lowest power consumption level at which a combination of an internal noise level associated with the selected stimulation signal frequency and bias current and an expected external noise level is within a predetermined allowable total noise level.

9. The touch sensing system of claim 8, where the expected external noise level is an expected external signal-to-noise ratio (SNR), the internal noise level is an internal SNR, and the predetermined allowable total noise level is a predetermined allowable total SNR.

10. The touch sensing system of claim 9, the processor further programmed for:
    computing an SNR headroom for external noise for each stimulation signal frequency and bias current pair by subtracting the predetermined allowable total SNR from the internal SNR associated with each stimulation signal frequency and bias current pair; and
    selecting the stimulation signal frequency and bias current pair having a smallest SNR headroom for external noise greater than the expected external SNR.

11. The touch sensing system of claim 9, the processor further programmed for:
    computing an SNR headroom for external noise for each stimulation signal frequency and bias current pair by subtracting the predetermined allowable total SNR from the internal SNR associated with each stimulation signal frequency and bias current pair; and selecting the stimulation signal frequency and bias current pair having a smallest SNR headroom for external noise greater than an acceptable external SNR.

12. The touch sensing system of claim 8, the processor further programmed for:

computing an external noise margin for each stimulation signal frequency and bias current pair by subtracting the internal noise level from the predetermined allowable total noise level associated with each stimulation signal frequency and bias current pair; and selecting the stimulation signal frequency and bias current pair having the smallest external noise margin greater than the expected external noise level.

13. The touch sensing system of claim 8, further comprising:

computing an external noise margin for each stimulation signal frequency and bias current pair by subtracting the internal noise level from the predetermined allowable total noise level associated with each stimulation signal frequency and bias current pair; and selecting the stimulation signal frequency and bias current pair having a smallest external noise margin greater than an acceptable external noise level.

14. The touch sensing system of claim 8, the processor further programmed for measuring the internal noise level for each of a plurality of stimulation signal frequency and bias current pairs to establish the internal noise level associated with each simulation signal frequency and bias current pair.

15. A non-transitory computer-readable storage medium having stored thereon a program for performing a method for selectively lowering power consumption, the method comprising:

for a particular expected external noise level, selecting a particular stimulation signal frequency and bias current pair from a plurality of stored stimulation signal frequency and bias current pairs for applying to one or more sense channels;

wherein the selected particular stimulation signal frequency and bias current pair has a lowest power consumption level at which a combination of an internal noise level associated with the selected stimulation signal frequency and bias current and the expected external noise level is within a predetermined allowable total noise level.

16. The non-transitory computer-readable storage medium of claim 15, where the expected external noise level is an expected external signal-to-noise ratio (SNR), the internal noise level is an internal SNR, and the predetermined allowable total noise level is a predetermined allowable total SNR.

17. The non-transitory computer-readable storage medium of claim 16, the method further comprising:

computing an SNR headroom for external noise for each stimulation signal frequency and bias current pair by subtracting the predetermined allowable total SNR from the internal SNR associated with each stimulation signal frequency and bias current pair; and selecting the stimulation signal frequency and bias current pair having a smallest SNR headroom for external noise greater than the expected external SNR.

18. The non-transitory computer-readable storage medium of claim 16, the method further comprising:

computing an SNR headroom for external noise for each stimulation signal frequency and bias current pair by subtracting the predetermined allowable total SNR from the internal SNR associated with each stimulation signal frequency and bias current pair; and selecting the stimulation signal frequency and bias current pair having a smallest SNR headroom for external noise greater than an acceptable external SNR.

19. The non-transitory computer-readable storage medium of claim 15, the method further comprising:

computing an external noise margin for each stimulation signal frequency and bias current pair by subtracting the internal noise level from the predetermined allowable total noise level associated with each stimulation signal frequency and bias current pair; and selecting the stimulation signal frequency and bias current pair having the smallest external noise margin greater than the expected external noise level.

20. The non-transitory computer-readable storage medium of claim 15, the method further comprising:

computing an external noise margin for each stimulation signal frequency and bias current pair by subtracting the internal noise level from the predetermined allowable total noise level associated with each stimulation signal frequency and bias current pair; and selecting the stimulation signal frequency and bias current pair having the smallest external noise margin greater than an acceptable external noise level.

* * * * *